United States Patent [19]
Catino

[11] Patent Number: 5,319,778
[45] Date of Patent: Jun. 7, 1994

[54] SYSTEM FOR MANIPULATING ELEMENTS IN LINKED LISTS SHARING ONE OR MORE COMMON ELEMENTS USING HEAD NODES CONTAINING COMMON OFFSETS FOR POINTERS OF THE LINKED LISTS

[75] Inventor: Robert J. Catino, Southlake City, Tex.

[73] Assignee: International Business Machines Corporation, Armonk, N.Y.

[21] Appl. No.: 731,840

[22] Filed: Jul. 16, 1991

[51] Int. Cl.$^5$ ............................................. G06F 15/40
[52] U.S. Cl. .................................. 395/600; 395/650; 364/963.2; 364/957.3; 364/251.5; 364/254.6; 364/283.1; 364/DIG.1
[58] Field of Search ......................... 395/600, 275, 650

[56] References Cited
U.S. PATENT DOCUMENTS

| | | | |
|---|---|---|---|
| 3,972,026 | 7/1976 | Waitman et al. | 340/172.5 |
| 4,123,795 | 10/1978 | Dean, Jr. et al. | 395/650 |
| 4,435,752 | 3/1984 | Winkelman | 395/600 |
| 4,493,105 | 1/1985 | Beall et al. | |
| 4,497,023 | 1/1985 | Moorer | 364/200 |
| 4,630,234 | 12/1986 | Holly | |
| 4,718,008 | 1/1988 | Chang et al. | |
| 4,760,390 | 7/1988 | Maine et al. | |
| 4,775,932 | 10/1988 | Oxley et al. | |
| 4,779,194 | 10/1988 | Jennings et al. | 395/650 |
| 4,796,178 | 1/1989 | Jennings et al. | 395/650 |
| 4,953,080 | 8/1990 | Dysarl et al. | 395/600 |
| 5,119,291 | 6/1992 | Flannagan et al. | 395/275 |
| 5,175,848 | 12/1992 | Dysarl et al. | 395/600 |
| 5,185,885 | 2/1993 | Dysarl et al. | 395/600 |

OTHER PUBLICATIONS

Digital Equipment Corporation, VAX Architecture Handbook, pp. 228-249, 1981.
Sebesta, VAX II: Structured Assembly Language Programming, Benjamin/Cummings Pub. Company, pp. 350-354, 1984.
Kapps et al., VAX Assembly Language and Architecture, Prindle, Weber & Schmidt, pp. 405-408, 1985.
H. Levy & R. Eckhouse, Jr. Computer Programming and Architecture: The Vax II, Digital Press, pp. 178-188, 1989.
"Linklist Instruction", J. J. Losq & G. S. Rao, IBM Tech. Disc. Bulletin, vol. 25, No.1, page 102, Jun. 1982.
"Priority Queue Controller Using Linked List Techniques", Lenyo et al, IBM TDB, vol. 31, No. 3, p. 41, Aug. 1988.
"Parallels List Transfer Using Vector Processing", IBM TDB, Chen et al, vol. 22, No. 6, p. 2491, Nov. 1979.
"List Processor", Birney et al, IBM Tech. Disc. Bulletin, vol. 20, No. 8, p. 2972, Jan. 1978.

Primary Examiner—Thomas C. Lee
Assistant Examiner—Peter Y. Wang
Attorney, Agent, or Firm—Arthur J. Samodovitz; Edward J. Kessler

[57] ABSTRACT

The present invention discloses a set of machine level instructions that perform primitive operations on singly or doubly linked lists. The instructions allow linked lists to be manipulated in such a way as to allow multiple processes in a parallel computing environment to access shared lists without the need for additional synchronization. Furthermore, the present invention does not place restrictions on the location of forward and backward pointer within the linked list elements.

6 Claims, 19 Drawing Sheets

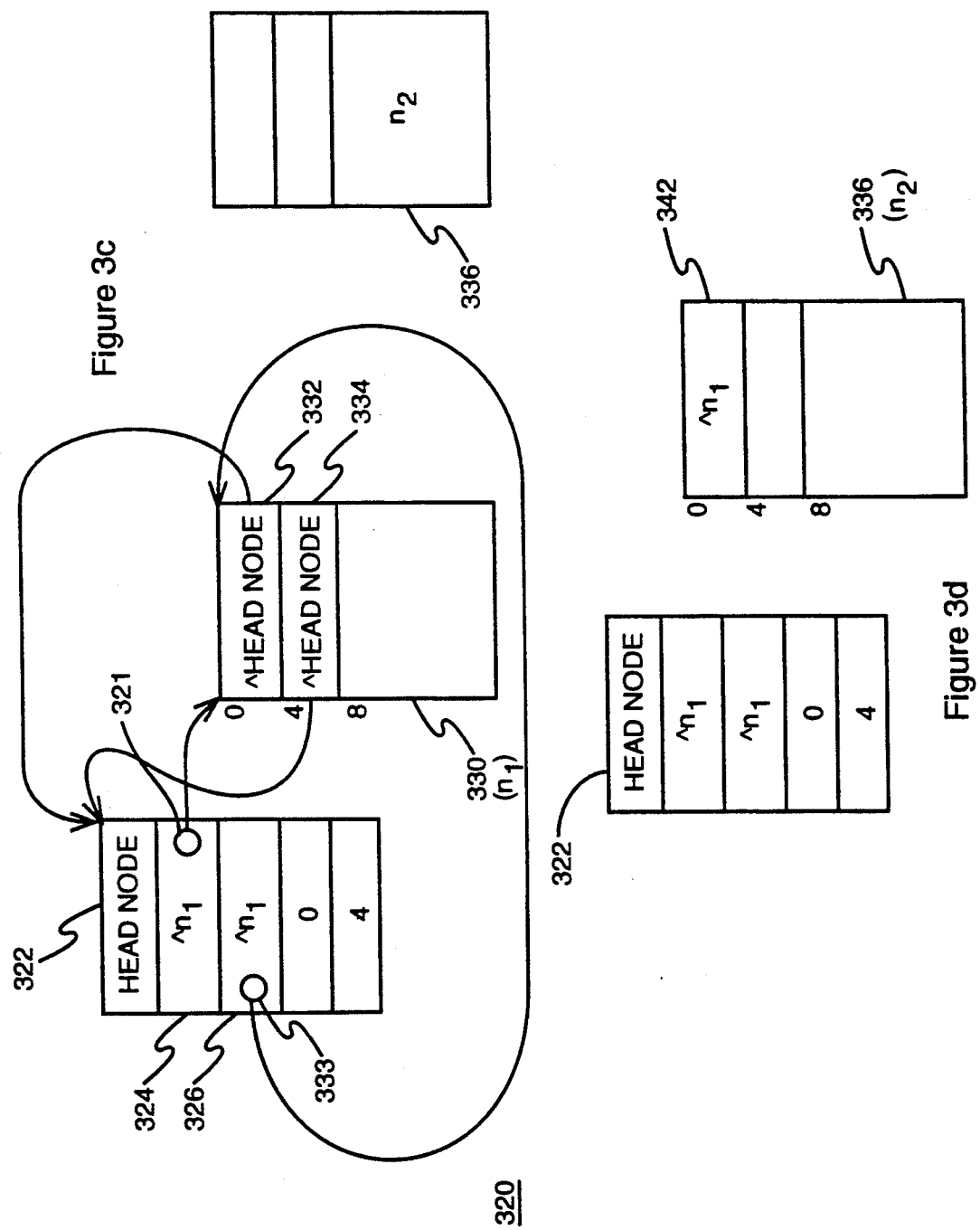

620

SYSTEM FOR MANIPULATING ELEMENTS IN LINKED LISTS SHARING ONE OR MORE COMMON ELEMENTS USING HEAD NODES CONTAINING COMMON OFFSETS FOR POINTERS OF THE LINKED LISTS

TECHNICAL FIELD

The present invention relates to the processing of data, and more particularly to a method and system for manipulating linked lists.

BACKGROUND ART

Linked lists are well known in the art, and various methods have been employed to manipulate linked lists. Linked lists are one of the most common data structures employed for the manipulation of data. Linked lists are particularly important within an operating system. Operating systems control a variety of resources simultaneously. A linked list might be used, for example, to hold requests for each individual resource.

Generally, linked lists can take two forms: (1) singly, circularly linked lists; or (2) doubly, circularly linked lists. Past methods of manipulating linked lists have concentrated on the handling of either singly or doubly linked lists, but not both. Thus, there is a need to flexibly manage a multiplicity of list types.

In the operation of a typical operating system, the system has a need to perform both Last In First Out (LIFO) operations and First In First Out (FIFO) operations. In the past, techniques to manipulate lists have concentrated on one of these operations, but not both. Operations of this type are very common for operating systems and multiprogramming subsystems, and as such, there is a need to be able to satisfy an operating system's need to frequently perform atomic LIFO and FIFO list manipulation instructions.

Past methods of maintaining doubly, circularly linked lists have centered around a single set of forward and backward pointers. Specific locations are set aside for these pointers by the operating system, and they are usually static. It is often difficult, if not impossible to have elements reside on multiple lists. Thus, there is a need to have location independence of forward and backward pointers.

Past methods have also had to concern themselves with elaborate error routines. If for example a plurality of instructions have been executed, in order to manipulate the list, and an error was detected, the system would need to run intricate routines to modify misplaced pointers. Thus, there is a need for advanced error detection so that gross programming errors can be detected immediately following the execution of the instruction.

An important property of linked list instruction is that they cannot be interrupted. When multiple processes have access to the same linked list, there is a need for synchronization between the processes. Past methods have locked an entire linked list so that other processes could not manipulate any part of the list simultaneously. Thus, there is a need for allowing part of the list to remain accessible while still providing a locking feature that allows list manipulation of multiple linked lists.

DISCLOSURE OF THE INVENTION

These and other problems in the art are solved in accordance with the teachings of the present invention, in which a method and system to manipulate linked lists are provided for use in digital processing systems.

The present invention discloses a set of machine level instructions that perform primitive operations on singly or doubly linked lists. A programming structure at the machine level provides for manipulation of linked lists in FIFO and LIFO data operations. A special data area called a head node is capable of defining different characteristics of the lists for each different application program. These characteristics include variable locations for the forward and backward pointers within the linked list elements. The instructions allow linked lists to be manipulated in such a way as to allow multiple processes in a parallel computing environment to access shared lists without the need for additional synchronization.

The present invention provides a single means of manipulating both singly and doubly linked lists. The present invention does not place any restrictions on the location of forward and backward pointers within the linked list elements. Consequently, the linked list elements used with the present invention can be defined with multiple sets of forward and backward pointers, enabling the list elements to reside in multiple lists.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings, wherein:

FIGS. 3c, 3d, 3e, and 3f are examples of the Enqueue on Head procedure of the present invention;

BEST MODE FOR CARRYING OUT THE INVENTION

I. Environment of the Present Invention

Figure 1A:
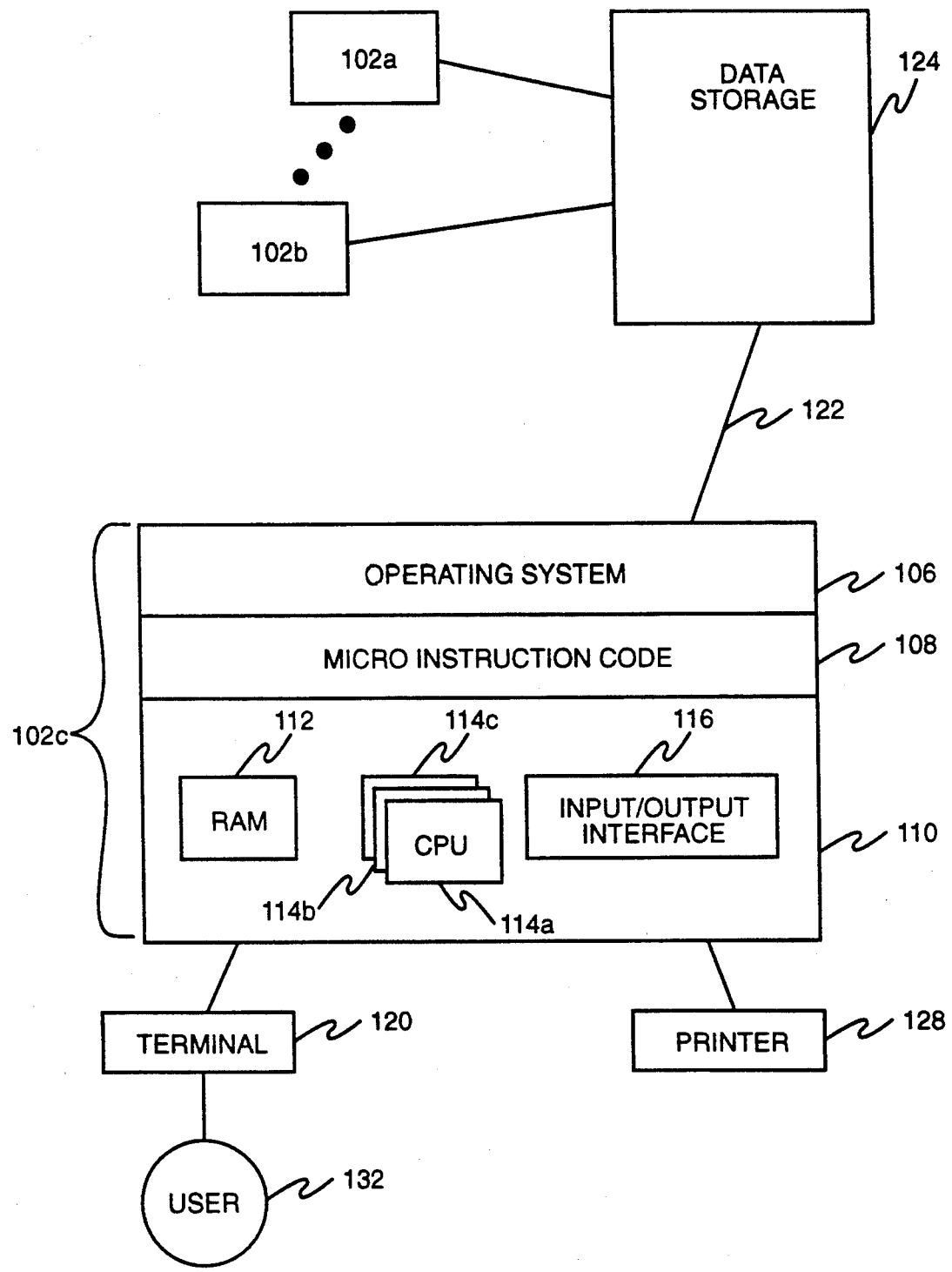
FIG. 1a shows an environment for the present invention.

A more detailed description of some of the basic concepts discussed in this section is found in a number of references, including "An Introduction to Database Systems," Vols. I and II, by C. J. Date (Addison-Wesley Publishing Company, Inc., 1990).

FIG. 1 illustrates an environment in which a preferred embodiment of the present invention operates. The preferred embodiment of the present invention operates on a computer 102. Alternatively, there may be a plurality of computers 102. The present invention contemplates linked lists in a parallel computing environment. The computer 102 includes a hardware unit 110 which includes multiple central processing units (CPU) 114, a random access memory (RAM) 112, and an input/output interface 116. The RAM is also called a main memory.

Each of the computers 102 includes an operating system 106, and may include micro-instruction code 108 (or a reduced instruction set, for instance).

The present invention discloses a system and method for updating a doubly or singly linked list. In a preferred embodiment of the present invention, the system comprises a new set of instructions that provide a means for updating a doubly or singly linked list.

The shared data storage device 124 is also called a secondary storage and may include hard disks and/or tape drives and their equivalents. The data device 124 represents non-volatile storage. Various peripheral components may be connected to the computer 104, such as a terminal 126, a data storage device 130, and a printing device 134. The operating system may use virtual memory. A user 132 can interact with the computer 102 via a terminal 120.

In a preferred embodiment of the present invention, the computer 102 is any International Business Machines (IBM) compatible personal or mainframe computer having an IBM 370 architecture. The operating system 106 of the preferred embodiment may be an IBM Multiple Virtual Storage/Enterprise System Architecture (MVS/ESA) or Virtual Machine/Enterprise System Architecture (VM/ESA). The present invention is, of course, not limited to these operating systems.

Those versed in the art will readily understand the equivalents to the above structure.

II. Overview

The list manipulation instructions of the preferred embodiment of the present invention are instructions which provide an atomic means of updating a doubly or singly linked list in a parallel computing environment. Because of the frequent, wide-spread use of lists in operating systems, efficient list manipulation primitives are essential to the performance of an operating system. Operating systems which execute in a parallel processing environment must be sensitive to the multiprocessing (MP) effects when managing shared lists, and thus the need for efficient list manipulation instructions is further underscored.

The list manipulation instructions of the preferred embodiment are described in relation to a "370" microprocessor environment, as described below. The present invention, however, contemplates the use of any form of presently known or future developed architectures used in combination with the disclosed invention, and is not limited to the 370 architecture.

Of all the list manipulation operations performed by operating systems, LIFO (Last In First Out) and FIFO (First In First Out) operations are particularly prevalent. To accommodate LIFO and FIFO operations, the present invention discloses a new programming structure (list processing Head Node structure) to be used in conjunction with three new instructions: (1) Enqueue on Head (ENQH), (2) Dequeue from Head (DEQH), and (3) Dequeue from Tail (DEQT).

Figure 1B:
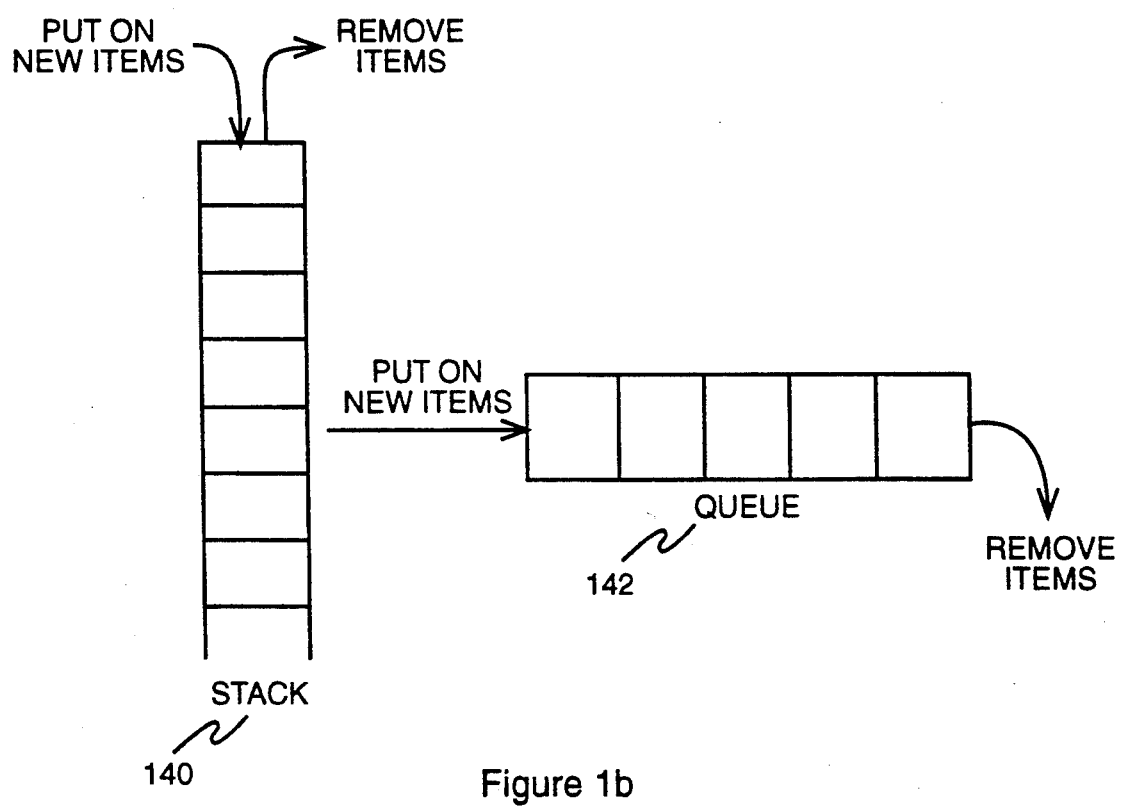
FIG. 1b is an example of a stack and a queue.

As shown in FIG. 1b, LIFO operations are commonly used for the manipulation of a stack 140. Typical stack algorithms include, for example, buffer management, activation record management in compilers, and memory management for fixed-size memory allocation. FIFO, on the other hand, is generally used for the manipulation of a queue 142. Typical uses for FIFO include free storage management for variable-size memory allocation, event list management in operating systems, and computer simulation using arrival queues.

III. System Architecture

A structural characteristic of most computer systems is that they tend to be modular. The present invention utilizes a computer system, as described above, with an operating system. Operating systems are also broken up into a plurality of modules with each modular having a different function. List manipulation is one particular function of an operating system.

Memory is made up of a set of addressable memory locations, usually words and/or bytes. A list element as used in this patent application will mean a set or group of words and/or bytes that form a block.

Figure 1C:
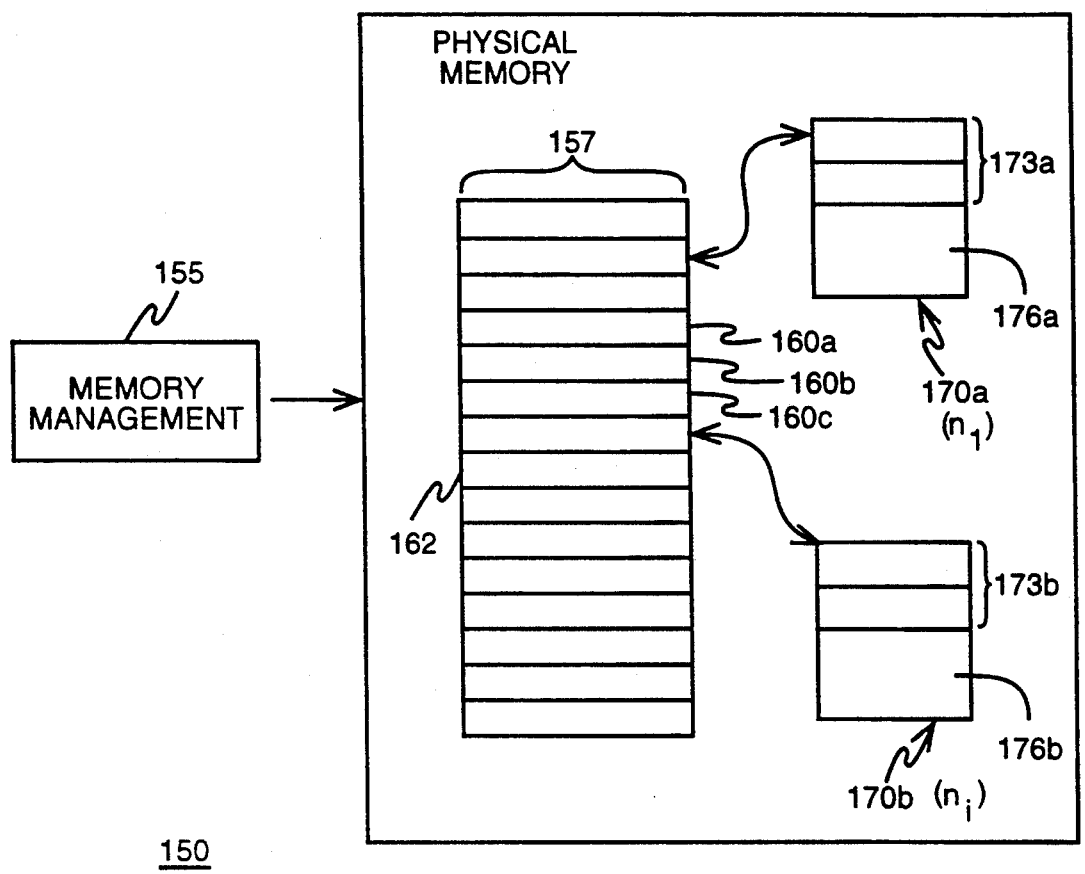
FIG. 1c is an example of a physical memory structure for the present invention.

Generally, as shown in FIG. 1c, the memory system 150 of the present invention includes a memory management unit 155 which is part of the operating system and physical memory 157. The memory management unit 155 allocates blocks within the physical memory 157. For example, in the diagram of FIG. 1c, two blocks 170a and 170b have been established by appropriate commands from memory management unit 155. These blocks can represent list elements on a linked list. Each of the blocks established as list elements includes, as described below, at least one set of forward and backward pointers 173 and a data area 176. The size of the data area 176 is variable, and may or may not span the memory blocks 160. This depends on the memory management procedure employed.

A more detailed description of some of the basic concepts discussed below is found in "Systems 370 extended architecture principles of operations."

Figure 1D:
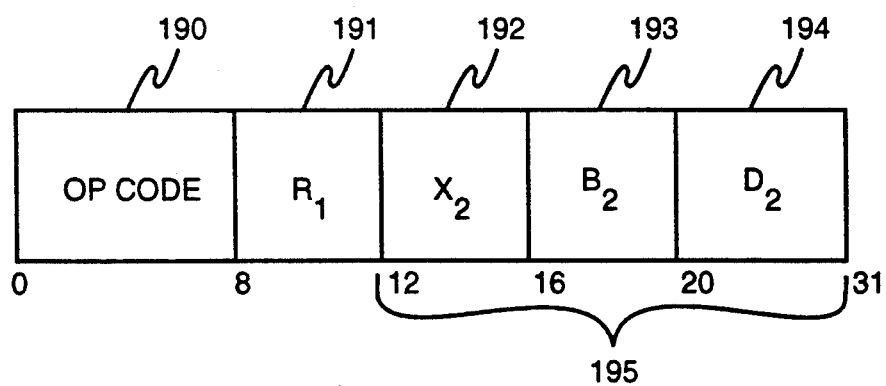
FIG. 1d is a representation of a format for the 370 architecture RX instruction.

FIG. 1d shows the format of an instruction for the IBM 370 architecture. Each instruction consists of two major parts: (1) an operation code (op code), which specifies an operation to be performed, and (2) a designation of operands that participate. Each instruction is in one of a plurality of basic formats. The present invention utilizes the RX format. The RX format has an instruction length of one word (or two halfwords). The format names indicate, in general terms, the classes of operands which participate in the operation. The RX format denotes a register-and-indexed-storage operation.

Generally, fields 191 through 194 are designated by code names, consisting of a letter and a subscript number. The subscript number denotes the operand to which the field applies. The $R_1$ 191 field is called the first operand. The R field designates a general register. The general register is usually 32 bits long (one word). The second operand is represented by $X_2$ 192, $B_2$ 193, and $D_2$ 194. In the RX format, the contents of the general registers designated by the $X_2$ 192 and $B_2$ 193 fields are added to the contents of the $D_2$ 194 fields to form the second-operand address. The B and X fields both designate a 32 bit general register.

a. Head Node Structure

Figure 2:
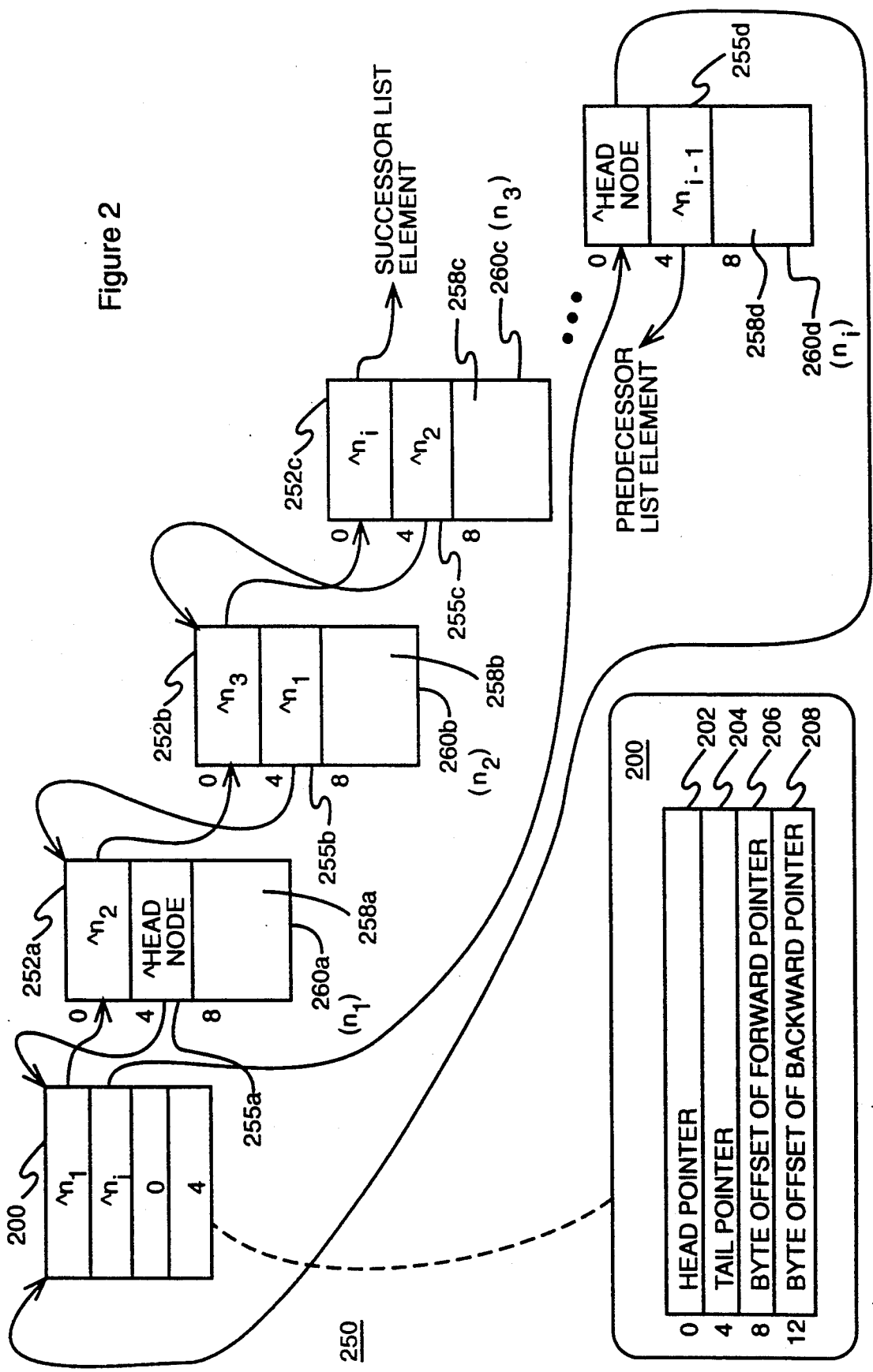
FIG. 2 is an example of a linked list with a Head Node.

Referring to FIG. 2, a head node 200 enables the list manipulation instructions ENQH 300, DEQH 400, and DEQT 500 described below in conjunction with FIGS. 3 through 8 to operate on a doubly, circularly linked list. The head node 200 is a special data structure which provides addressability to list elements 260 on a linked list 250 and defines the offsets of the forward and backward pointers (or links) within the list elements 260. The backward and forward pointers define the location of a predecessor element and successor element, respectively.

FIG. 2 shows a queue with a plurality of list elements or blocks 260a, 260b, 260c, and 260d. Each list element 260 contains a forward pointer 252, a backward pointer 255, and data 258. The head node 200 structure contains a head pointer 202, a tail pointer 204, a forward pointer byte offset 206, and a backward pointer byte offset 208.

The head pointer 202 points to the first or head list element 260a in the linked list. The tail pointer 204 points to the last or tail list element 260d in the linked list. The head pointer 202 and the tail pointer 204 can be any size addressable memory location. The preferred embodiment uses a word as its typical addressable memory location. However, depending upon the memory capability of the system being employed, any size addressable memory location could be used.

The forward pointer byte offset 206, which also has a word as its addressable memory location, is the relative byte location in each list element 260 of the forward pointer 252 to the successor element. The backward pointer byte offset 208, also a word in length, is the relative byte location in each list element 260 of the backward pointer 255 to the predecessor element. The forward pointer byte offset 206 and the backward pointer byte offset 208 represent the number of bytes inside the list element 260 where the pointer to the successor element or predecessor element, respectively, can be located.

For example, in FIG. 2 the head pointer 202 in the head node 200 has the value $n_1$. The symbol " " symbolizes that there is a pointer to a specific location. In this example, $n_1$ indicates that the head pointer 202 is pointing to the list element $n_1$ 260a. List element $n_1$ is the first (head) list element in the linked list 250. The tail pointer 204 in the head node 200 has the value $n_i$. This symbolizes a pointer to list element $n_i$ 260d. List element $n_i$ is the last (tail) list element in the linked list 250. In reality, the head pointer 202 and tail pointer 204 would contain an addressable memory location which would represent a pointer to that memory location.

Each list element 260, as stated above, has three components. The first component is a forward pointer 252, which points to the successor list element 260. Thus, list element $n_1$ 260a has a forward pointer 252a to list element $n_2$ 260b, list element $n_2$ 260b has a forward pointer 252b to list element $n_3$ 260c, and so on. The last list element in the linked list 250 is $n_i$ 260d. The forward pointer 252d of the last list element 260d in the linked list points back to the head node 200.

The second element in the list elements 260 is a backward pointer 255. The backward pointer 255 points to the predecessor list element 260. Accordingly, list element $n_3$ 260c has a backward pointer 255c to list element $n_2$ 260b, list element $n_2$ 260b has a backward pointer 255b to list element $n_1$ 260a, and list element $n_1$, the first block in the linked list, has a backward pointer 255a back to the head node 200.

The third element in the list elements 260 is the actual data 258. The data 258 could include, among other things, processes, application specific data, resources, statistics, or general information. The data 258 is, of course, the information that is stored in memory that the list manipulation instructions of the present invention store for easy handling.

By programming convention, the list manipulation instructions assume that an empty list (i.e. a linked list which contains no list elements 260) will be defined by a head node with head pointer 202 and tail pointer 204 pointing to the head node 200 itself.

The list manipulation instructions of the present invention can also be used to manipulate singly, circularly linked lists. By programming convention, the head node 200 will define a singly, circularly linked list when the tail pointer 204 contains a value of 'FFFFFFFF'X. The usage of the other data items in the head node 200 is defined as for the doubly, linked list described above.

When the head node 200 defines a singly, circularly linked list, the list manipulation instructions ignore the contents of the byte offset of the backward pointer 208 in the head node 200 and also assume no existence of backward pointers 255 in the list elements 260.

By programming convention, the list manipulation instructions assume that the empty, singly, circularly linked list will be defined by a head node 200 with the head pointer 202 pointing to the head node 200 itself and the tail pointer with a value of 'FFFFFFFF'X.

b. Enqueue on Head Function

Figure 3A:
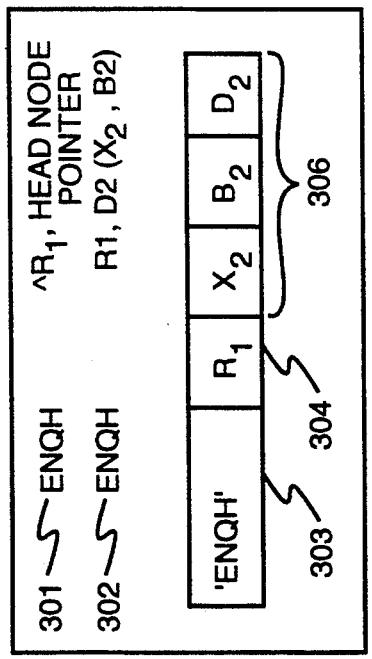
FIG. 3a is a representation of the Enqueue on Head procedure instruction.

Referring to FIGS. 3a through 3e and FIG. 4. FIG. 3a shows the list manipulation instruction of the present invention. The pseudo op-code 301 for the ENQH instruction has a first operand ($n_2$) and a second operand (head node). The assembly language version of the instruction 302 also has a first operand (general register R1 304) and a second operand (index registers D2(X2,B2) 306). The general function of the ENQH instruction 300 is to enqueue a list element 336 specified by a first-operand 304 location in the instruction onto the head of the linked list defined by a second-operand location 306. The second-operand 306 location must specify the head node 322 in the format described above in connection with FIG. 2.

Figure 3E:
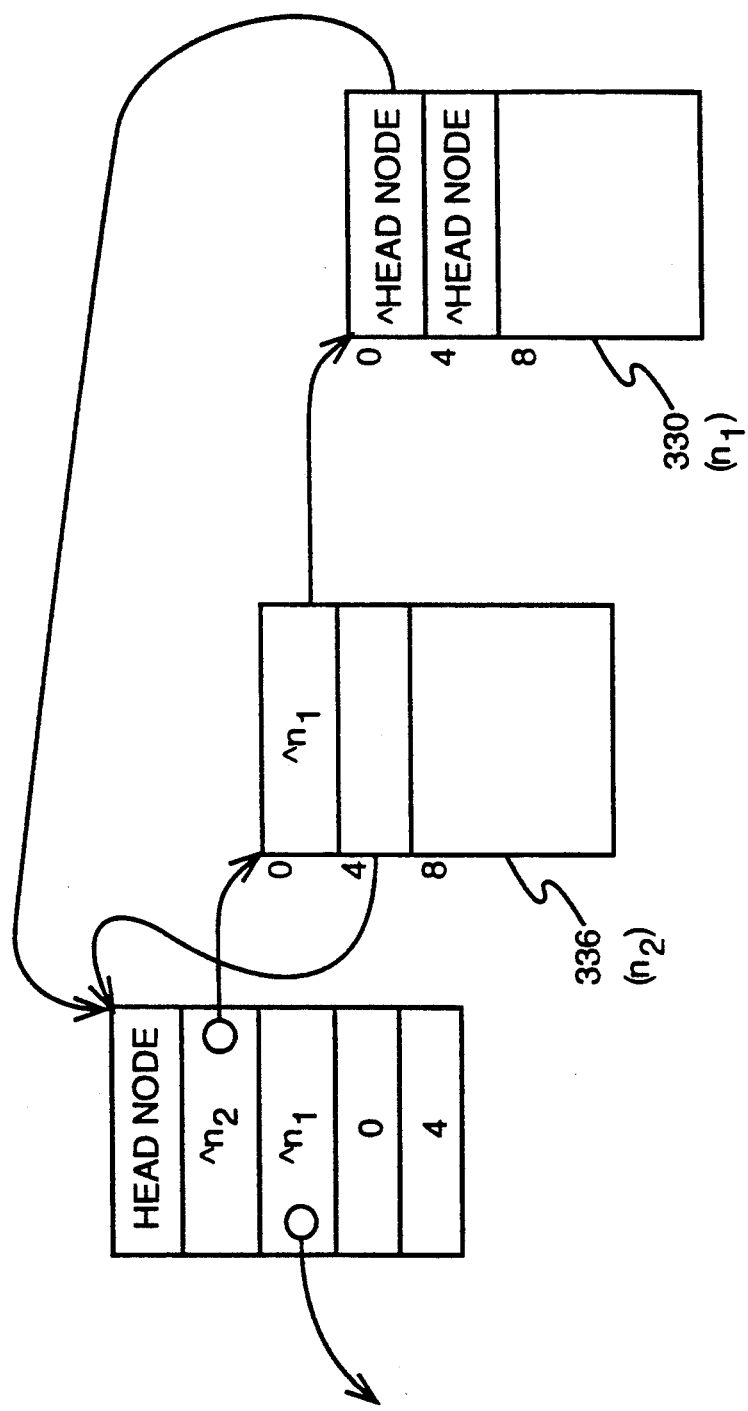
Figure 3F:
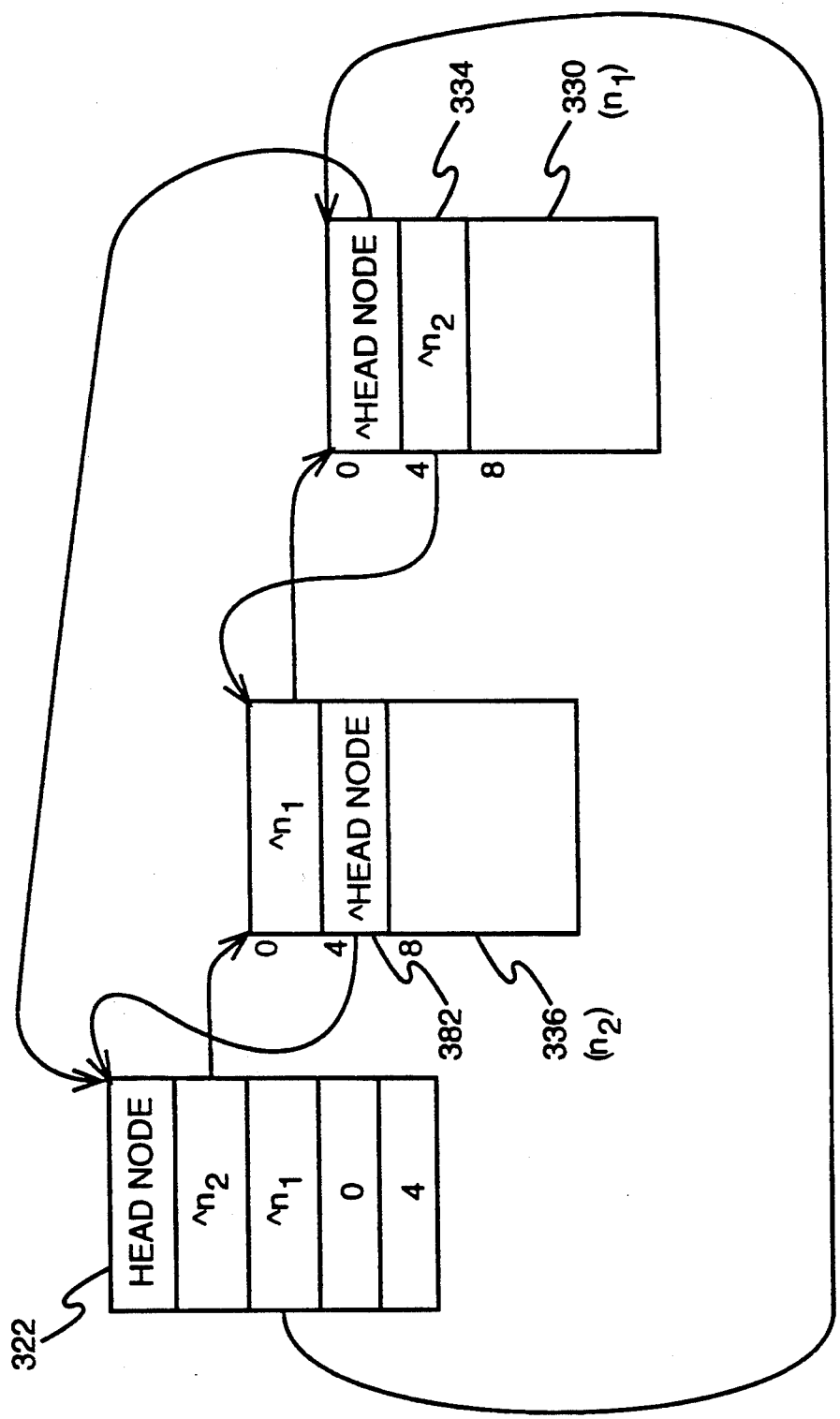
Figure 4:
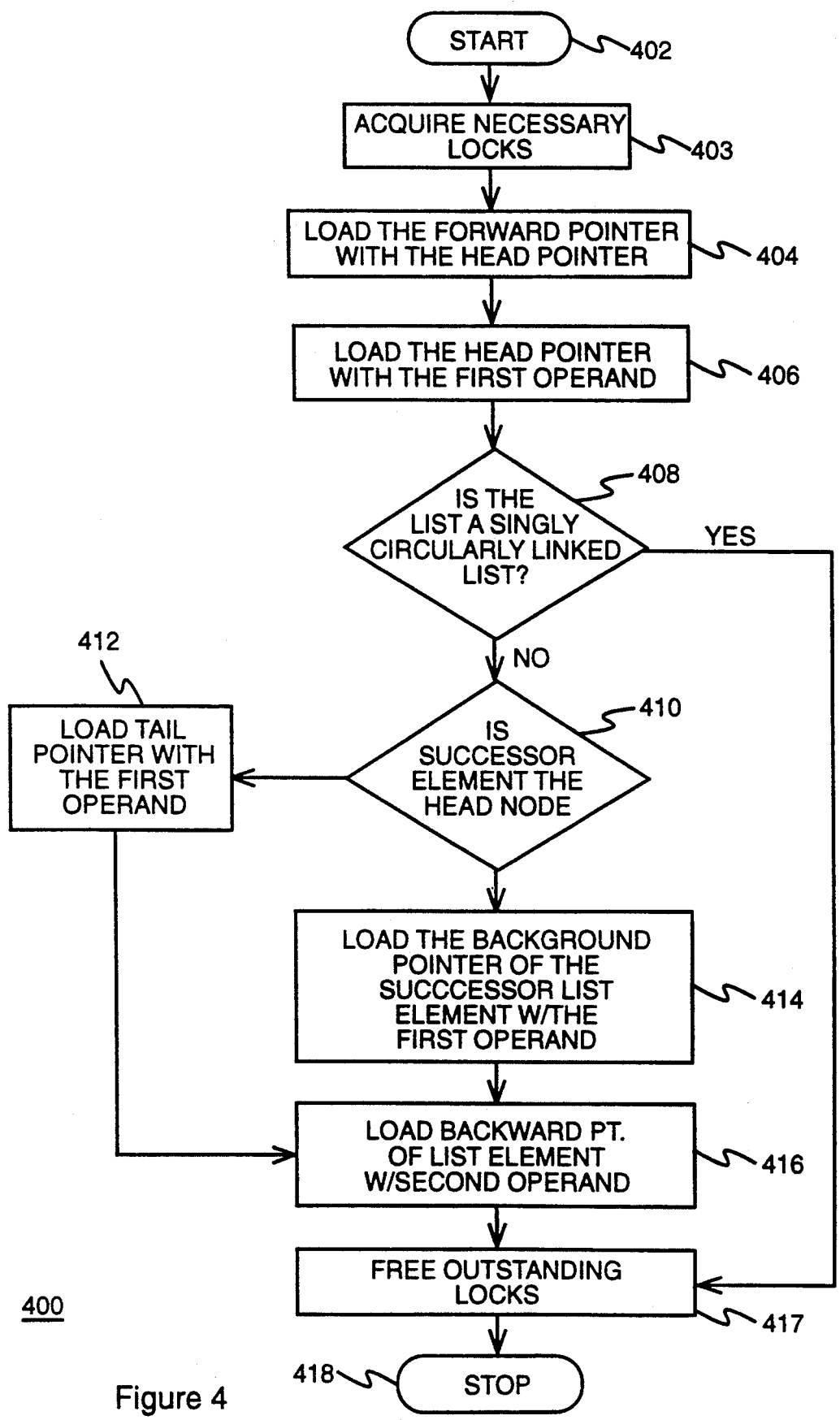
FIG. 4 is a flow chart of the Enqueue on Head procedure of the present invention.

A flowchart 400 for a list manipulation instruction to enqueue a list element is shown in FIG. 4. The ENQH procedure 400 of the present invention is described in combination with an example shown in FIGS. 3c through 3f.

FIG. 3c shows a linked list 320 containing a head node 322 and one list element $n_1$ 330. The object of the instruction is to enqueue a list element $n_2$ 336 onto the head of the linked list 320. The ENQH procedure 400 begins when a new list element 336 enters the system. An execute instruction command is given by the operating system and the procedure begins 402. Head node 322 has its head pointer 334 pointing to $n_1$ 330 and the tail pointer 326 pointing to $n_1$ 330. The list element n 330 has both forward 332 and backward 334 pointers pointing to the head node 322. This is a typical setup when there is only one list element in the linked list. The objective of procedure 400 is to enqueue list element $n_2$ 336 onto the head of the list 320.

From block 402, the procedure 400 proceeds to block 403, in which the head pointer 324 is locked. As stated above, the list manipulation instructions allow linked lists to be manipulated in such a way as to allow multiple processes in a parallel computing environment to access shared lists without the need for additional synchronization. The locking feature of the present invention allows parallel processes that want to manipulate a given linked list at the same time to be mutually excluded from simultaneously executing a single linked list. Only one process can manipulate a linked list at a given time. If two processes were allowed to manipulate a list in parallel, the pointers in the linked list would be inaccurate.

Figure 3B:
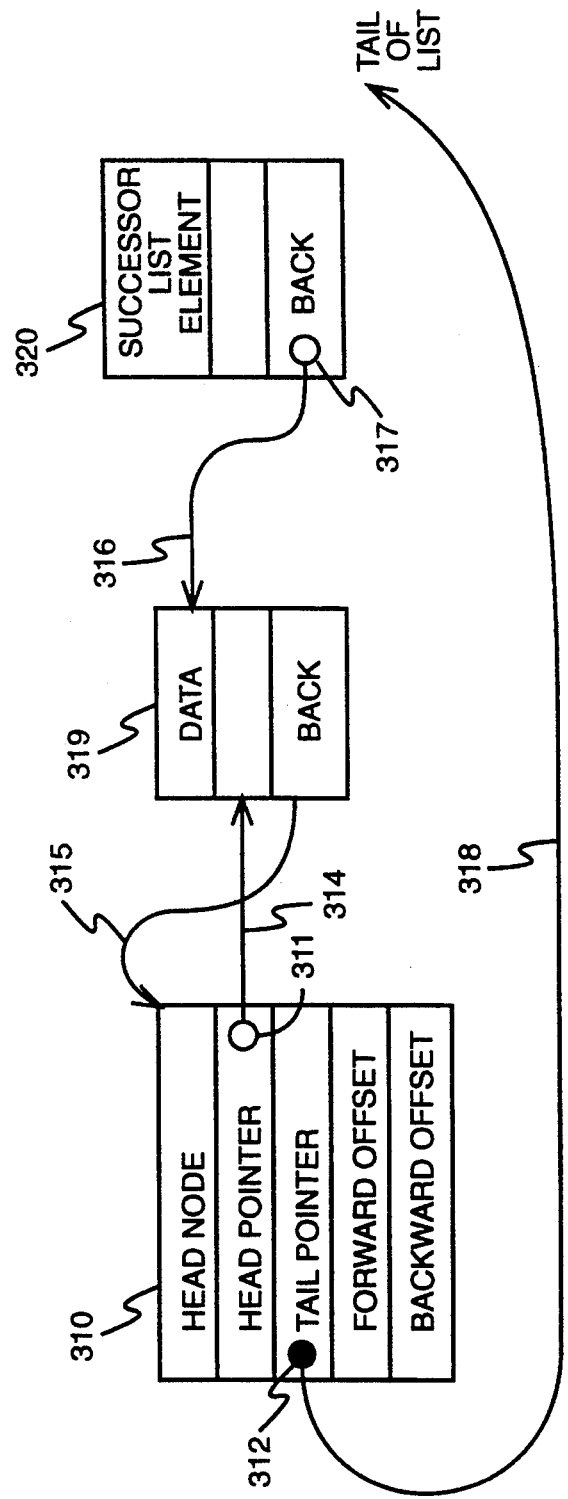
FIG. 3b is an example of the locking feature of the Enqueue on Head procedure.

The present invention excludes processes from manipulating a linked list already being modified by another process by locking various pointers as required by the list modification operation being executed as discussed in detail below. As shown in FIG. 3b, certain pointers are always (unconditionally) locked and others are potentially locked. The head pointer 314 in head node 310 is always locked as indicated by the open circle 311. In addition, the successor list element's 320 backward pointer 316 is also always locked as indicated by the open circle 317. However, the tail pointer 318 is potentially lockable as indicated by a darkened circle 312. The tail pointer 318 is only locked when there is one list element in the linked list. In other words, there is no successor list element since there is only one list element in the linked list, and therefore, the successor list element's backward pointer cannot be locked. Consequently, the head node takes the place of the successor list element and the tail pointer 318 is locked.

The locking procedure of the present invention guarantees that the process manipulating the linked list will not be interrupted by other processes trying to gain access to the linked list. The locking procedure blocks access to the linked list by two or more processes and assures that each linked list will be mutually excluded from simultaneous use thereby synchronizing the progress of otherwise independent processes.

The locking feature stays unaltered until the processes looking to gain access to the list have been signaled by the process manipulating the list that it has completed its assignment. The locking feature makes up part of the micro-instruction code 108 discussed above.

From block 403, the procedure 400 proceeds to block 404, in which the forward pointer 342 of the new list element 336 is loaded with the contents of the head pointer 324 of the head node 322. As shown in FIG. 3d, the pointer (addressable location) to $n_1$ located in the head pointer 324 is loaded into the forward pointer 342 of $n_2$ 336.

Next, the procedure 400 proceeds to block 406, in which the head pointer 324 of the head node 322 is loaded with the contents of the first operand 304 of the instruction ENQH 300. In this example, as shown in FIG. 3e, the first operand contains a pointer to $n_2$. Thus, the pointer for $n_2$ 336 is loaded into the head pointer 324.

The procedure 400 then checks 408 to see if the linked list being manipulated is a singly, circularly linked list or a doubly, circularly linked list. If the linked list 320 is a singly, circularly linked list then the procedure stops. All the pointers that are necessary to maintain the list have been updated.

However, if the list is a doubly linked list, the procedure 400 continues. The procedure 400 proceeds to block 410, in which the linked list is checked to determine if the successor list element is the head node 322. If the successor list element is the head node 322, then the procedure 400 flows to block 412. Block 412 indicates that the tail pointer 326 is loaded with the contents of the first operand 304.

However, if the successor list element is not the head node 322, then the procedure 400 flows to block 414. The backward pointer 334 of the successor list element 330 is loaded with the contents of the first-operand 304. As shown in FIG. 3d, the backward pointer 334 of list element 330 is loaded with a pointer to $n_2$.

Next, the procedure 400 proceeds to block 416. The backward pointer 382 of the new list element 336 is loaded with the contents of the second-operand 306. As shown in FIG. 3f, the backward pointer 382 of the new list element 336 is loaded with a pointer to the head node 322.

At this point, the present invention no longer needs to exclude other processes from manipulating the linked list since the procedure 400 to enqueue a new list element at the head of the list has been completed. Thus, as block 417 indicates, all the outstanding locks associated with the pointers as required by the list modification operation being executed are removed. For example, in FIG. 3f the locks associated with the head pointer 324 and the tail pointer 326 have been removed.

At this point the procedure 400 to enqueue a new list element at the head of a list is completed 418. The new list element 336 has been enqueued, and all of the pointers have been updated to correspond to the appropriate address locations.

The DEQH instruction indicates when there is a problem through an error/status flag. Two typical error/status conditions that might arise with the DEQH instruction are (1) the instruction has been completely successful or (2) the head node contains invalid values. Both of these conditions would trigger a flag, and the operating system would take appropriate action.

c. Dequeue from Tail

An instruction to dequeue a list element from the tail (DEQT) of a linked list is described below with reference to FIG. 5 and FIGS. 6a through 6e. FIG. 6a shows the list manipulation instruction of the present invention. The pseudo op-code 601 for the DEQT instruction has a first operand (R1) and a second operand (Head Node). The Assembly language version of the instruction 602 also has a first operand (general register R1 604) and a second operand (index registers (D2, (X2,B2) 606. Generally, the function of the DEQT instruction 600 is to dequeue a list element 636 from the tail of the linked list defined by the second-operand location 606. The second-operand location 606 must specify a head node in the format described above in connection with FIG. 2. Since this instruction requires the list elements to have backward pointers, this instruction requires that the list elements form a doubly, circularly linked list.

Figure 5:
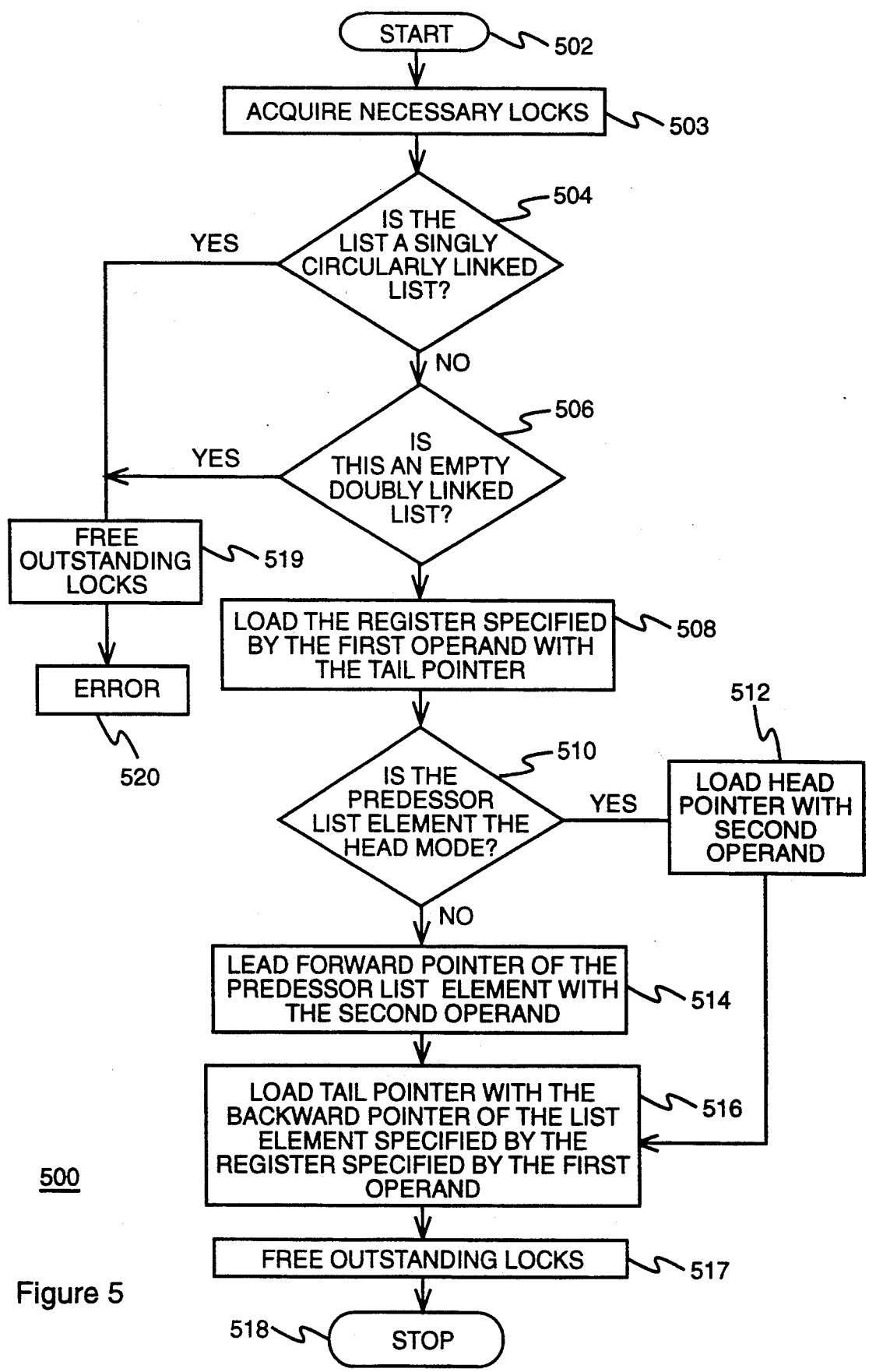
FIG. 5 is a flow chart of the Dequeue from Tail procedure of the present invention.
Figure 6A:
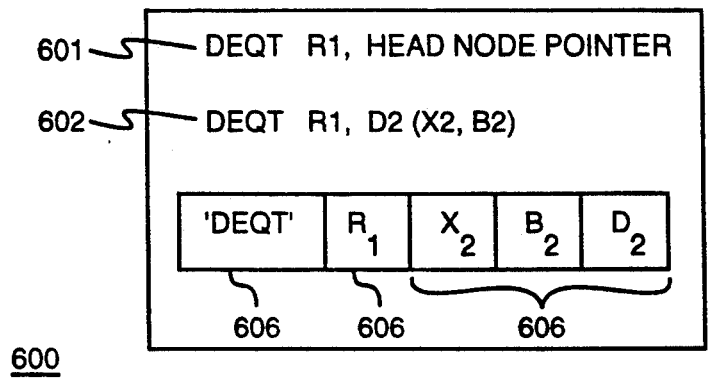
FIG. 6a is a representation of the Dequeue from Tail instruction.
Figure 6B:
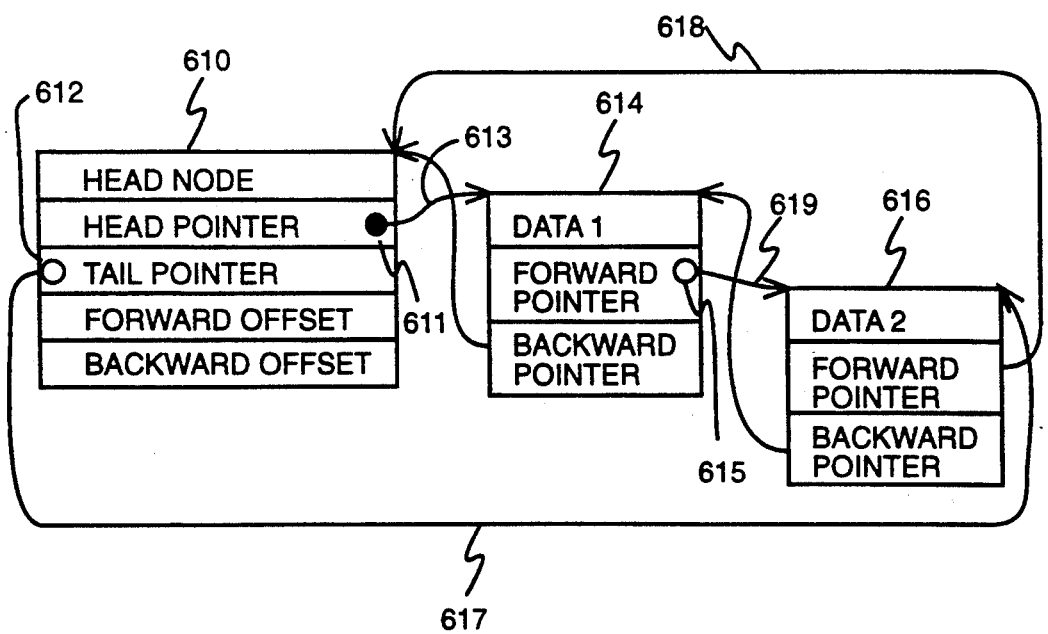
FIG. 6b is an example of the locking feature of the Dequeue from Tail procedure.

A flowchart 500 for a list manipulation instruction to dequeue a list element from the tail is shown in FIG. 5. The DEQT procedure 500 of the present invention is described in combination with an example shown in FIGS. 6c, 6d, and 6e.

Figure 6C:
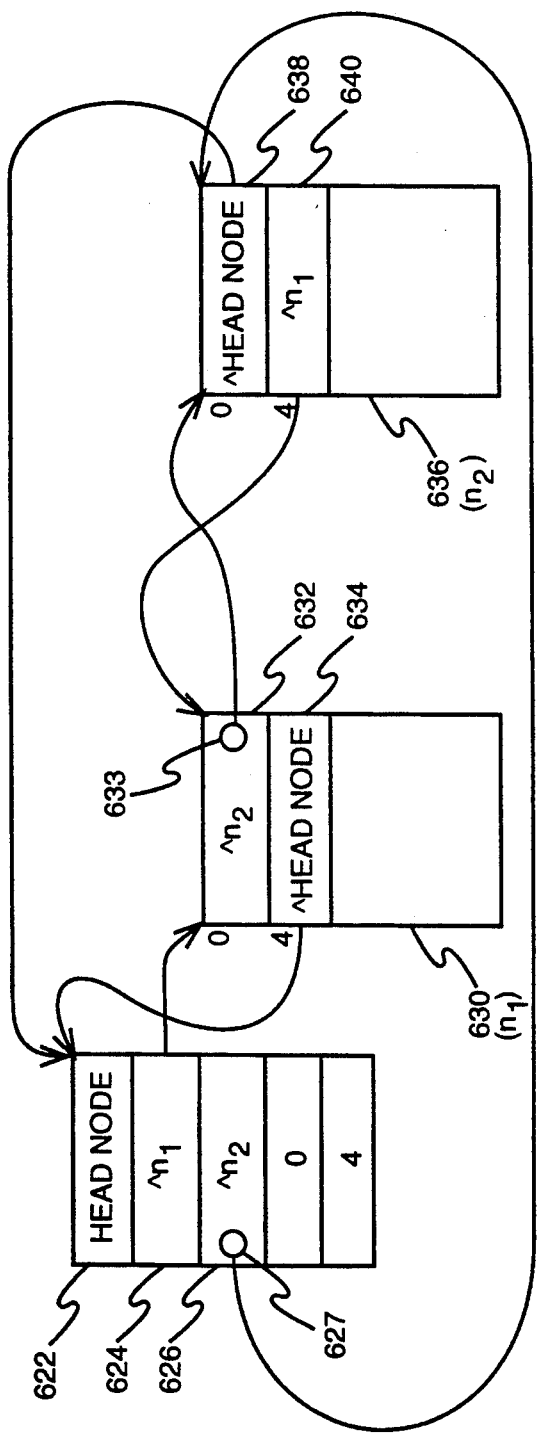
FIGS. 6c, 6d, and 6e are examples of the Dequeue from Tail procedure of the present invention.

FIG. 6c shows a list 620 containing a head node 622 and two list elements 630 and 636. The object of this example is to dequeue list element 636, the last (tail) list element in the linked list 620. The DEQT procedure 500 starts when the operating system, for example, wants to remove a list element 636 from the tail of the list 620. The operating system would send a message, and the procedure 500 would start 502.

Block 503 indicates that the tail pointer is locked. Once again, the locking feature allows parallel processes that want to manipulate a given linked list at the same time to be mutually excluded from simultaneously performing conflicting operations on a singly linked list. As shown in FIG. 6a the locking feature for the DEQT instruction always unconditionally locks the tail pointer 617 as indicated by the open circle 612. In addition, the predecessor list element's 614 forward pointer 619 is always unconditionally locked. The Head Node's 610 head pointer 613 is potentially lockable as indicated by a darkened circle 611. The head pointer 613 is only locked when there is only one list element in the linked list. In other words, there is no predecessor list element when there is only one list element in the linked list, and therefore, the head node takes the place of the predecessor list element and the head pointer 613 is locked.

The present invention only locks two of the pointers found in the linked list. Thus the ENQH procedure 400 and the DEQT procedure 500 can be performed simultaneously without the need for additional synchronization, with the exception of lists with only one element. The locking feature only locks those portions of the linked list that need to be held mutually exclusive for that particular instruction to execute, thereby freeing up other portions of the list to be manipulated by different instructions.

The procedure 500 proceeds to block 504, where it initially checks to determine if the list 620 is a singly, circularly linked list. If a singly, circular linked list is detected, then the procedure immediately stops and sends an error message 520 back to the operating system. As mentioned above, the procedure 500 does not work on singly, circularly linked list, because the procedure 500 requires backward pointers. In the example shown in FIG. 6c, the linked list 620 is a doubly, circularly linked list and therefore there is no error message given.

Once it is determined that the list is in fact a doubly, circularly linked list, then the procedure 500 proceeds to block 506 where it checks to see if the linked list is empty. If the list is empty, then the procedure 500 immediately terminates and an error message 520 is sent to the operating system. The error message indicates that there is a problem, since there are absolutely no list elements in the linked list to remove. In the example shown in FIG. 6c, the list has two list elements 630 and 636. Thus, there would be no error message.

If block 504 or block 506 produce an error messages then the outstanding locks associated with the relevant pointers must be removed as indicated in block 519.

Next, the procedure 500 begins with the manipulation of the list. Block 508 indicates that the tail pointer 204 is loaded into a general register 655. This general register is a location in memory set aside by the operating system for storing data. The general register is pointed to by an address located in the first operand of the instruction for DEQT of the present invention.

Figure 6D:
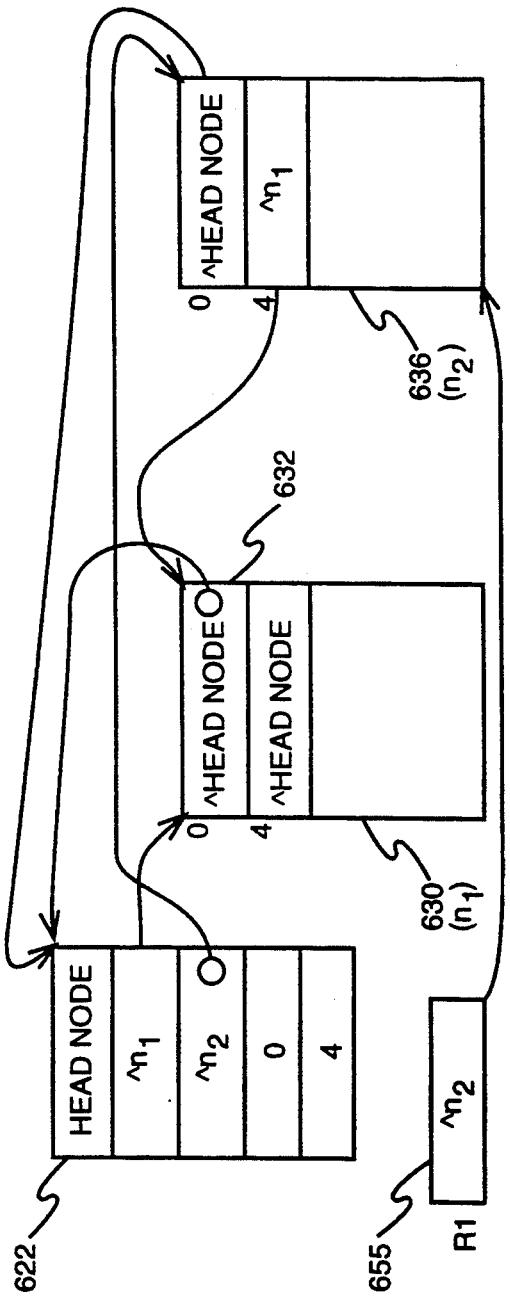

In the example, the general register R1 655 is specified by an address located (symbolized by R1) in the first operand 604. The general register R1 655 is loaded with the contents of the tail pointer 626. In this example as shown in FIG. 6d, general register R1 655 is loaded with a pointer to $n_2$ 636.

The procedure 500 proceeds to block 510. Block 510 determines whether the predecessor list element is the head node 622 or another list element. If the predecessor list element is the head node 622, then the procedure 500 proceeds to block 512.

Block 512 indicates that the head pointer 624 is loaded with the contents of the second operand 606. The second operand 606 contains a pointer to the head node 622. In other words, if the predecessor list element is the head node 622, then once the tail list element is removed, the head node 622 would be the only element left in the linked list. Thus, the head node's 622 head pointer 624 would point to the head node 622 itself. The procedure 500 would then proceed to block 516.

On the other hand, if the predecessor list element is not the head node 622, but a list element, then the procedure 500 proceeds to block 514. As indicated in block 514, the forward pointer 632 of the predecessor list element 630 is loaded with the contents of the second operand 606. Once again, the second-operand 606 specifies the location of the head node 622. Since the tail list element's 636 forward pointer 638 always points to the head node 622, the forward pointer 632 of the predecessor list element 630 is replaced with a pointer to the head node 622 once the tail list element 636 is removed. Thus, the predecessor list element 630 becomes the new tail list element. As shown in FIG. 6d, the predecessor list element's forward pointer 632 is replaced with a pointer to the head node 622.

Figure 6E:
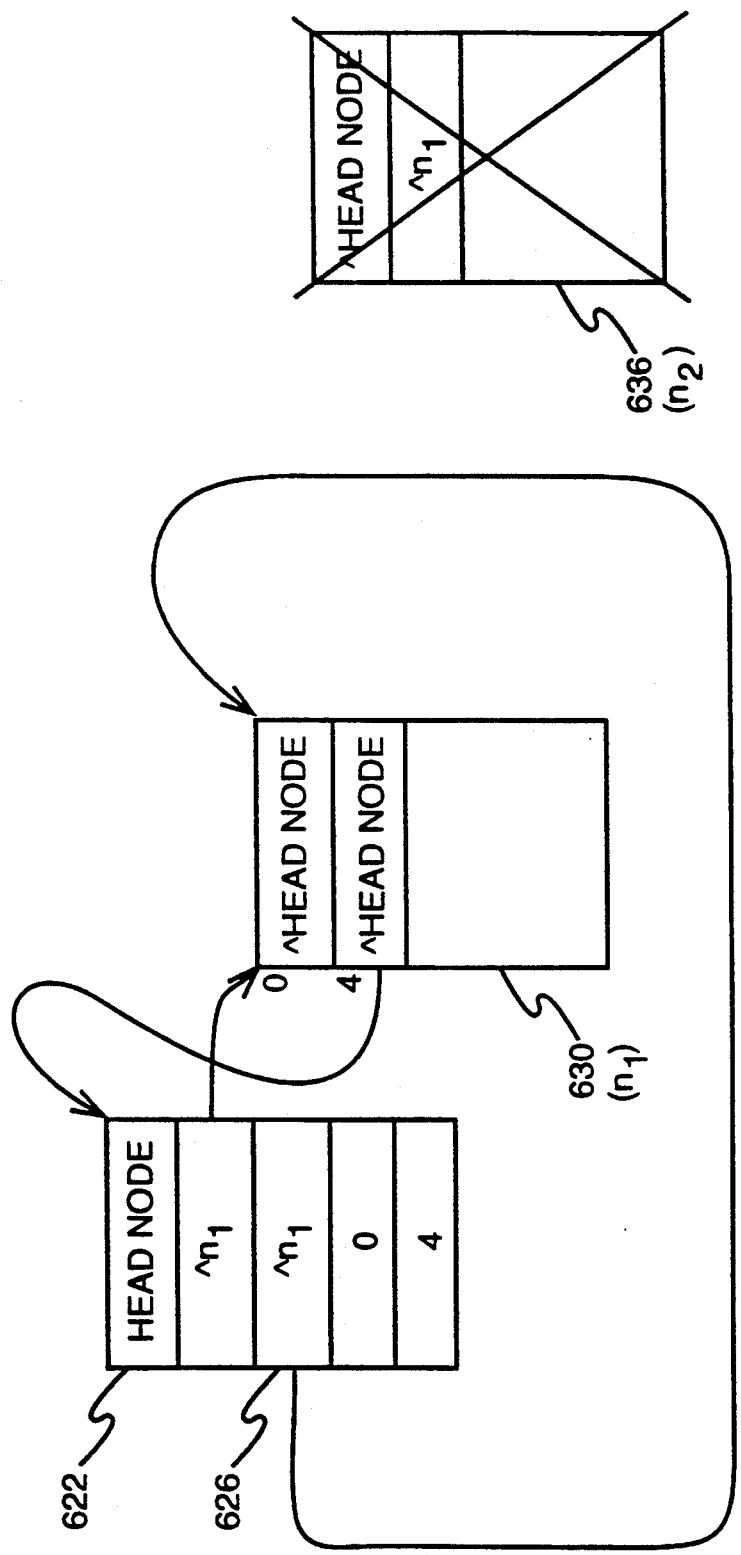

Finally, as shown in FIG. 6e, the tail pointer 626 is loaded with the backward pointer of the list element specified by the register 655 specified by the first operand 604. In this example, register 655 points to list element $n_2$ 636. Thus the backward pointer 640 located in list element $n_2$ is loaded into the tail pointer 626. The backward pointer 640 has a pointer to $n_1$. Therefore, the pointer to $n_1$ is loaded into the tail pointer 626. This completes the DEQT operation. List element 636 has been removed from the linked list 620. It should be noted, however, that the pointers in list element 336 remain intact; but they are of no particular importance once the list element has been dequeued from the linked list.

Once the DEQT operation has been completed, the outstanding locks associated with the relevant pointers must be removed as indicated in block 517. In this example, the tail pointer 626 and the successor forward pointer 632 (the forward pointer of list element n1) would be unlocked. Thus allowing other processes to access the linked list 620.

Analogous to the ENQH instruction, the DEQT instruction has, in addition to the error messages outlined above, an error/status condition message in the case of (1) the instruction being completely successful and/or (2) if the head node contains invalid values.

d. Dequeue from Head

An instruction to dequeue a list element from the head (DEQH) of a linked list is described below with reference to FIG. 7 and FIGS. 8a through 8e. FIG. 8a shows the list manipulation instruction of the present invention. The pseudo op-code 801 for the DEQH instruction has a first operand (R1) and a second operand (Head Node). The assembly language version of the instruction 802 also has a first operand (general register R1 804) and a second operand (index registers D2(X2,B2) 806). Generally, the function of the DEQH instruction is to dequeue a list element from the head of a linked list defined by the second-operand location. The second-operand location must specify a head node in the format described above in connection with FIG. 2. The list elements may form either a doubly or singly, circularly linked list.

Figure 7:
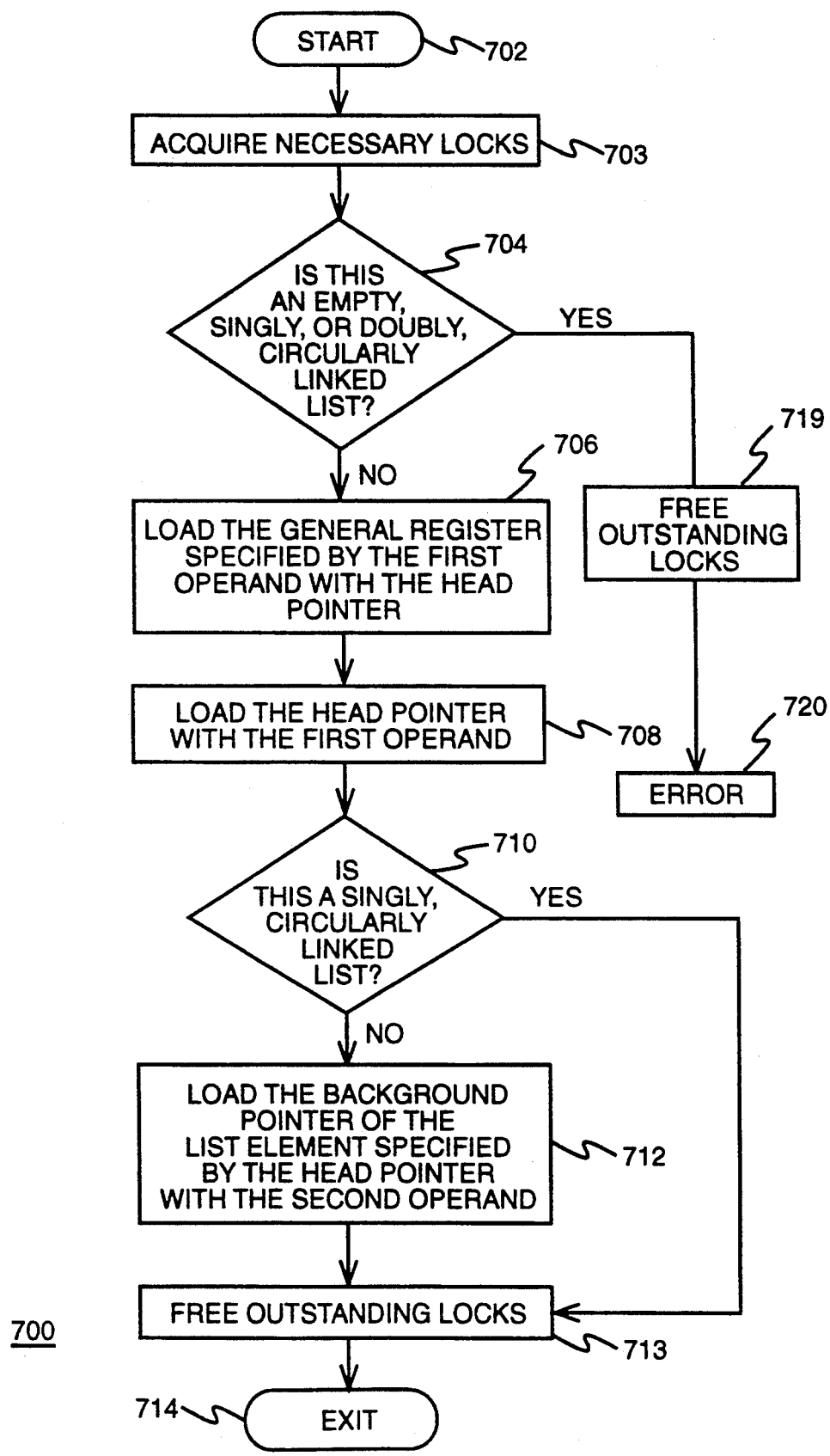
FIG. 7 is a flow chart of the Dequeue from Head procedure of the present invention.
Figure 8A:
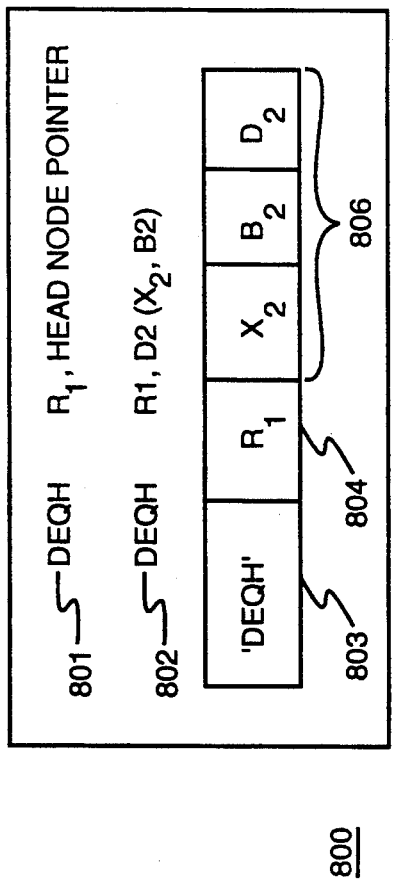
FIG. 8a is a representation of the Dequeue from Head instruction.

A flowchart 700 describing the procedure for dequeuing a list element from the head of a linked list is shown in FIG. 7. The DEQH procedure 700 of the present invention is described in combination with an example shown in FIGS. 8c, 8d, and 8e.

Figure 8B:
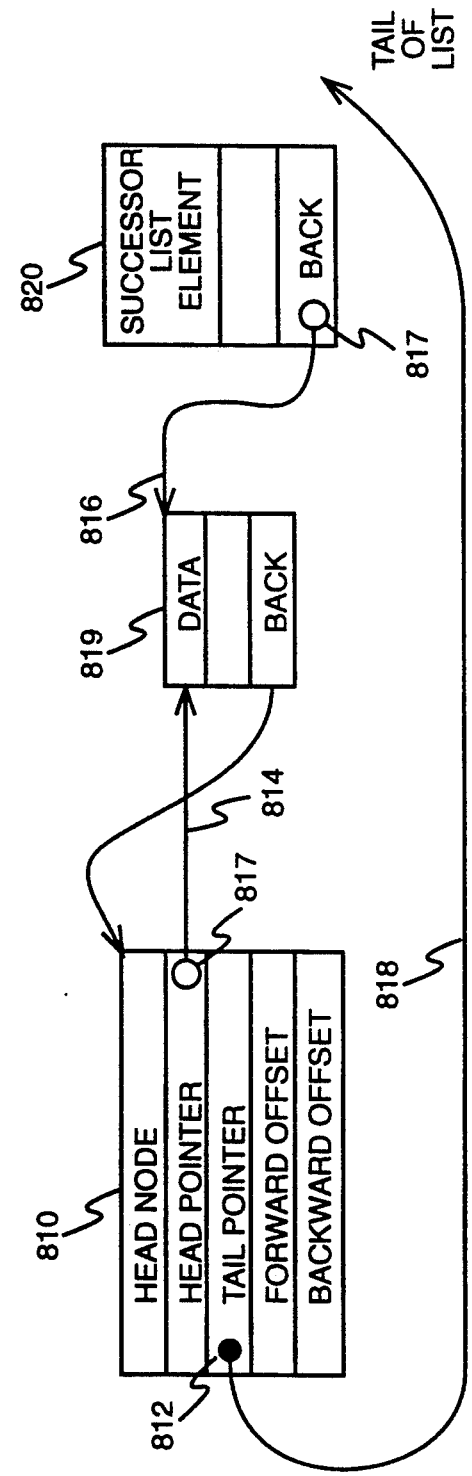
FIG. 8b is an example of the locking feature of the Dequeue from Head procedure.
Figure 8C:
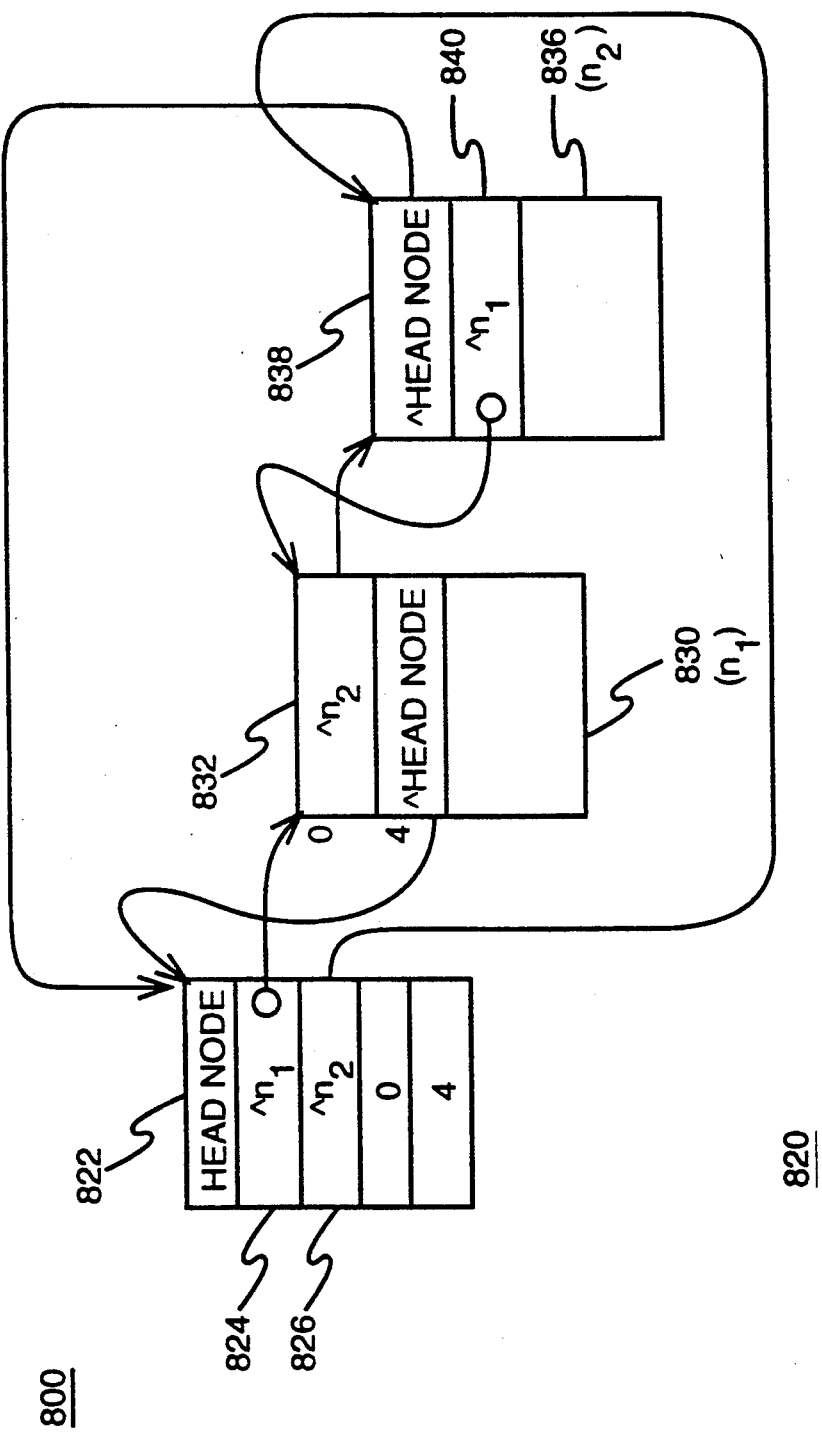
FIGS. 8c, 8d, and 8e are examples of the Dequeue from Head procedure of the present invention.
Figure 8D:
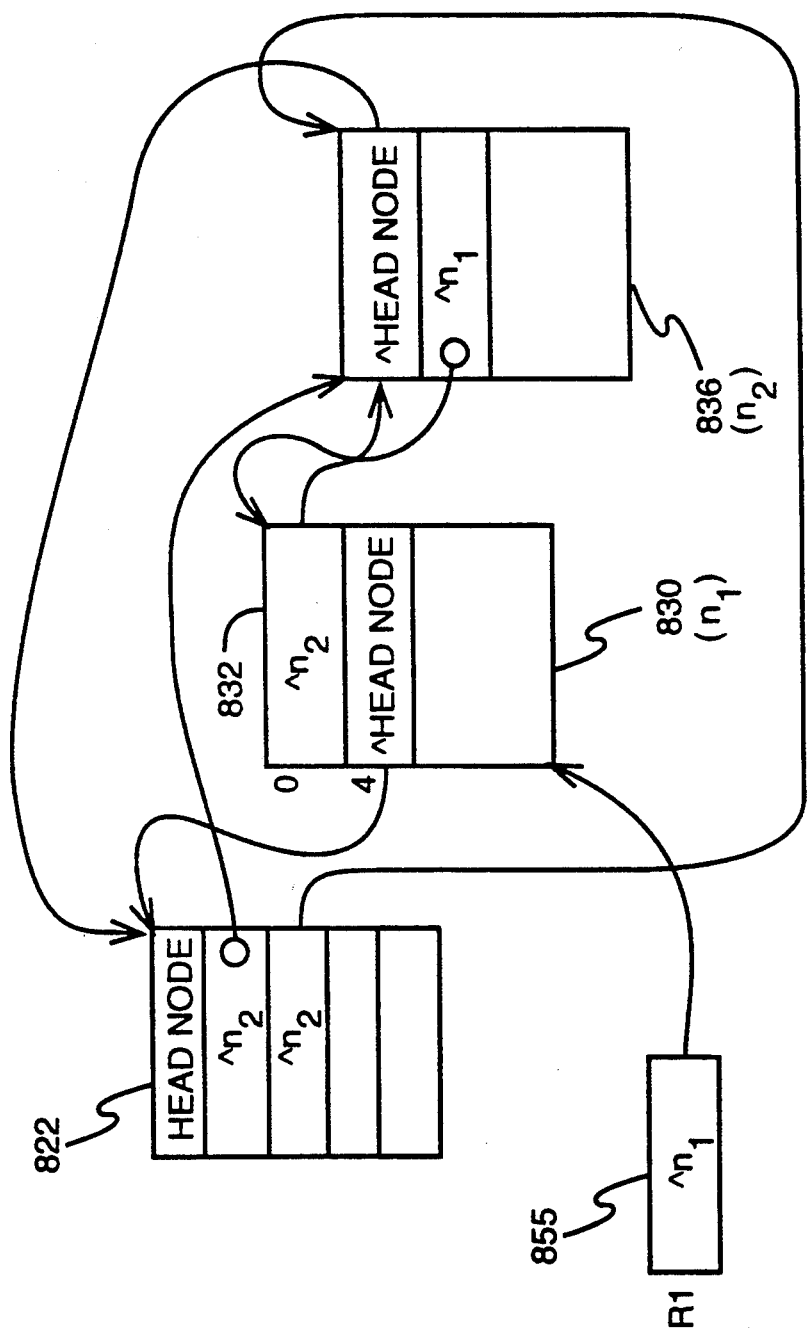

FIG. 8c shows a list 820 containing a head node 832 and two list elements 830 and 836. The present invention could conceivably have a large list of elements only constrained by system memory limits. The object of this procedure is to dequeue list element 830 from the list. List element 830 is clearly the head (first) element in the queue. Once again, the operating system would send a message to dequeue a list element from the head and the procedure 700 would start 702.

Block 703 indicates that the head pointer in locked. The locking feature of the DEQH instruction shown in FIG. 8b is exactly the same as that described above in connection with the ENQH instruction.

Block 704 checks to determine if the linked list 820 is empty (i.e. the linked list has no list elements); this is done regardless of whether the linked list 820 is singly or doubly, circularly linked. If the linked list 820 is empty then the procedure 700 indicates that there is an error 720. The procedure 700 stops and an error signal is propagated back to the operating system. If the linked list 820 is not empty, as shown in FIG. 8c (two list elements 830 and 836), then the procedure 700 continues to block 706.

If block 704 produces an error message then the outstanding locks associated with the relevant pointers must be removed as indicated in block 719.

Block 706 loads a general register 855 located in storage with the head pointer 824. The general register 855 is specified by the first operand 804 of the DEQH list manipulation instruction 800. As the example indicates in FIG. 8d, the general register R1 855 is loaded with a pointer to $n_1$.

Next, the procedure 700 flows to block 708 where the head pointer 824 is loaded with the forward pointer of the list element specified by the contents of the general register 855. In this case, the list element specified by the general register is $n_1$ 830. Therefore, the head pointer 824 is loaded with the contents of the forward pointer 832 of list element $n_1$ 830. The forward pointer 832 contains a pointer to $n_2$ 836. Thus, the head pointer 822 is loaded with a pointer to $n_2$ 836.

The procedure 700 then proceeds to block 710 where it is determined whether the linked list 820 is singly, circularly linked. If it is a singly, circularly linked list 820 then the procedure 700 freezes the outstanding locks 713 and exits 714. However, if the linked list is a doubly, circularly linked list then the procedure 700 flows to block 712. The linked list 820 shown in the example is a doubly, circularly linked list, and consequently, the procedure 700 does proceed to block 712.

Figure 8E:
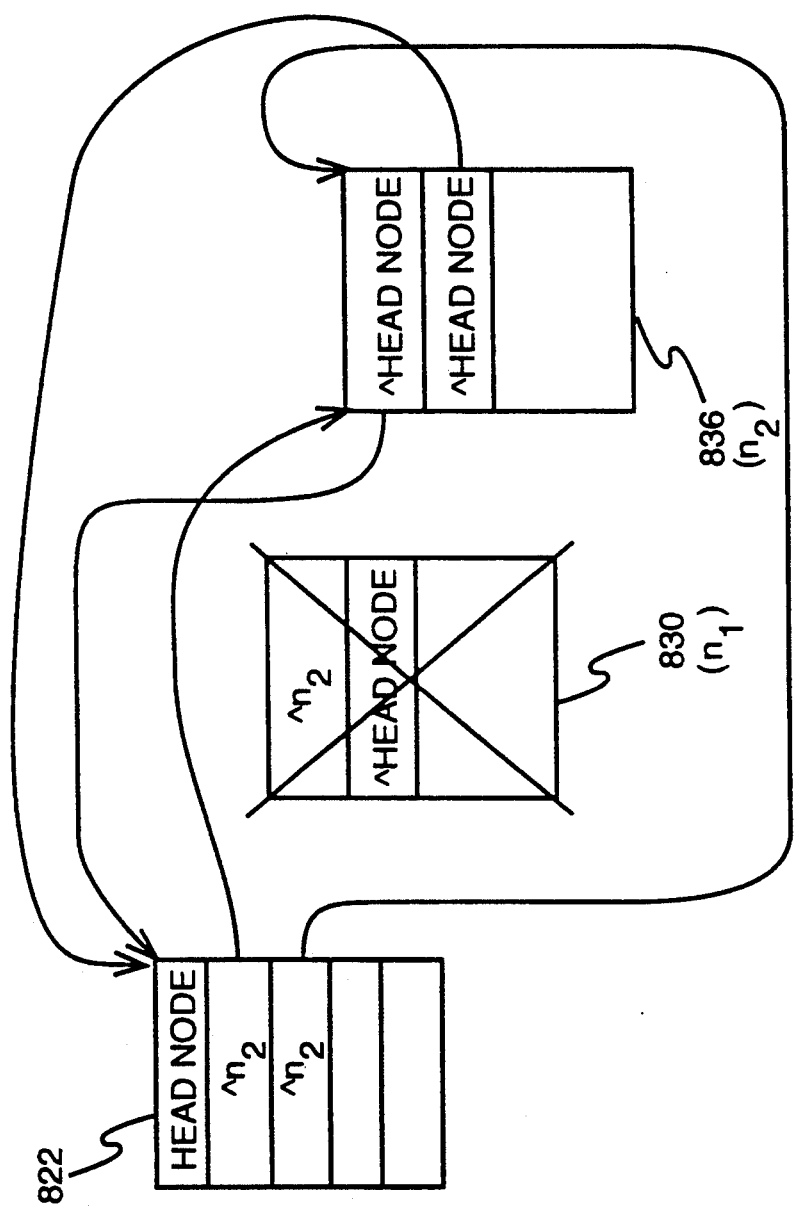

Block 712 loads the backward pointer of the list element specified by the head pointer 824 with the contents of the second-operand 806. Referring to the example as shown in FIG. 8e, the list element specified by the head pointer 824 is list element $n_2$ 836. Therefore, the backward pointer 840 of list element $n_2$ 836 is loaded with the contents of the second-operand which contains a pointer to the head node 822.

At this point the procedure 700 is complete and the logic flows to block 713. List element 830 has been removed from the linked list 820 and remaining in the linked list 820 is one list element 836 and the head node 822.

Once the DEQH operation has been completed, the outstanding locks associated with the relevant pointers must be removed as indicated in block 713. In this example, the head pointer 824 and the predecessor forward pointer 840 (the backward, pointer of list element $n_2$) would be unlocked, thus allowing other processes to access the linked list 620.

It should be noted, once again, that the pointers in list element 830 remain intact; but they are of no particular importance once the list element has been dequeued from the linked list.

The DEQH instruction also contains an error/status condition message for indicating that (1) the instruction has been completely successful and/or (2) that the head not contains invalid values.

IV. An Example of Multiprocessing

Figure 9:
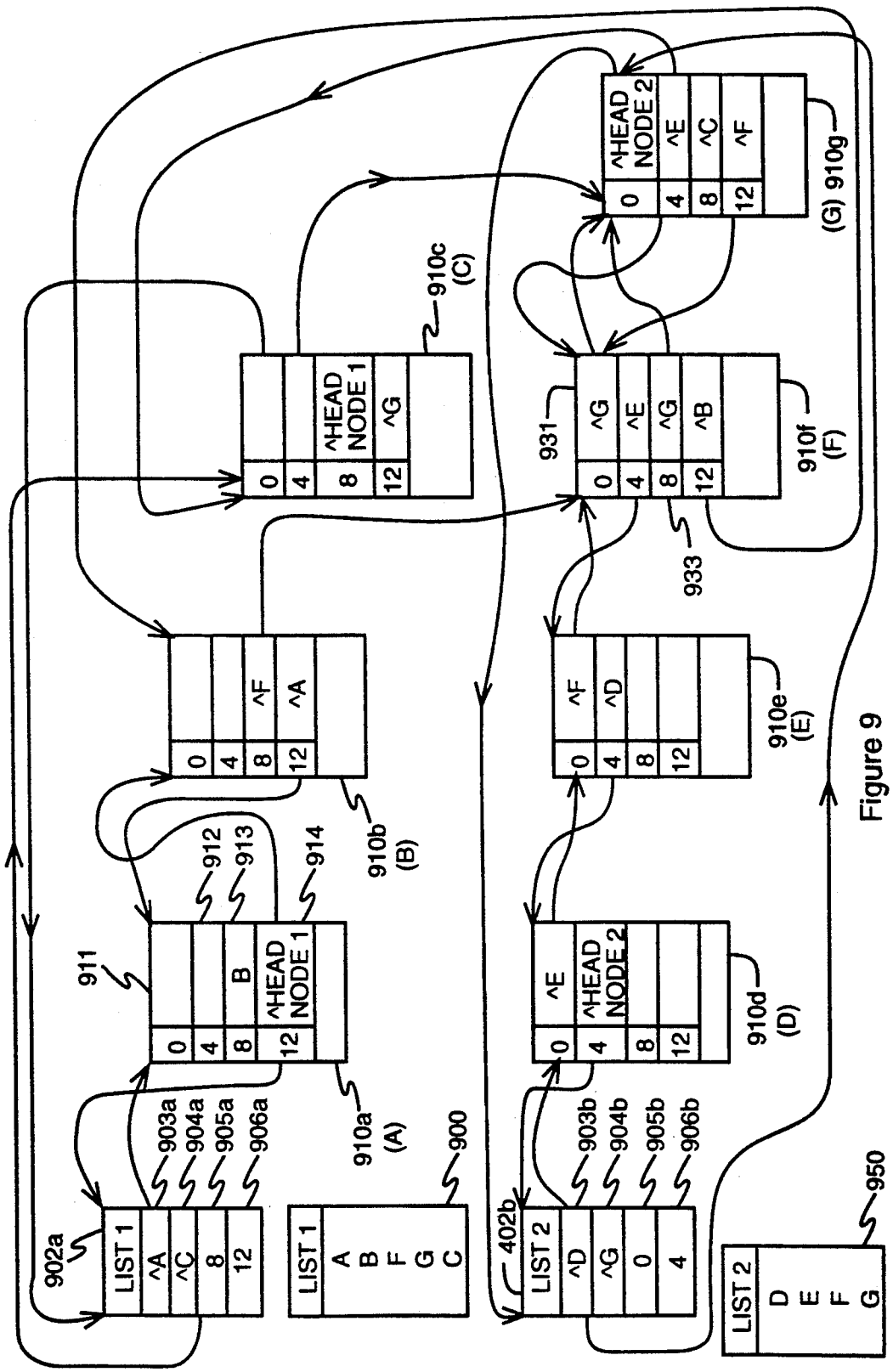
FIG. 9 is an example of the Head Node of the present invention with multiple queues.

Referring to FIG. 9, an example is shown of two linked lists 900 and 950 with multiple list elements in common. Generally, one of the features of the present invention is that each list element can contain more than one set of forward and backward pointers. Each individual head node, as described above, has a forward and backward offset to indicate exactly where the pointers are located in the list elements for that particular linked list. This allow linked lists to be manipulated in such a way as to allow multiple processes in a parallel computing environment to access shared lists without the need for additional synchronization.

FIG. 9 shows List 1 900 and List 2 950. List 1 900 has a head node 902a in the format described above and list elements A (910a), B (910b), C (910c), F (910f), and G (910g). The head node 902a of List 1 has a head pointer 903a and a tail pointer 904a pointing to the head of the list (list element A (910a)) and the tail of the list (list element C (910c)), respectively. List 2 950 has a head node (902b) and list elements D 910d, E 910e, F 910f, and G 910. Similarly to List 1, the head node 902b of List 2 has a head (903b) and tail 904b pointer pointing to the head of the list (list element E (910e)) and the tail of the list (list element G (910g)), respectively.

Both head nodes 902a and 902b have a forward pointer byte offset 905 and backward pointer byte offset 906. As indicated above, the byte offset is the relative byte location in each list element. Head pointer 902a has, for example, a forward pointer byte offset equal to eight (8). This indicates that the forward pointer in each list element 910 for that particular list is located at the eighth addressable memory location. Similarly, head node 902a has a backward pointer byte offset equal to twelve (12). Head node 902b has a forward byte offset equal to zero (0) and a backward pointer byte offset equal to four (4). This scheme of having location independence of forward and backward pointers for each list element 910, allows list elements 910 t o reside on multiple lists at the same time.

Thus, list element F 910f, for example, resides on both List 1 and List 2. List element F has two sets of forward and backward pointers. Specifically, List 2 which has list element 910f as an element has a forward pointer 931 located at byte location zero pointing to list element G 910g and a backward pointer 932 located at byte location four pointing to list element E 910e; and List 1 which also has list element 910f as an element has a forward pointer 933 located at byte position eight pointing to list element G 910g and a backward pointer 934 located at byte position twelve pointing to list element B 910b. The present invention allows a plurality of sets of independently located forward and backward pointers. This allows a list element to reside on multiple lists. The locking feature of the present invention described above allows the list elements to be manipulated without additional synchronization.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A data processor system comprising:
   a memory;
   first means for generating a first linked list comprising a first plurality of linked list elements and writing said first plurality of linked list elements into respective blocks of said memory, each of said first plurality of linked list elements comprising a pointer to another linked list element in said first linked list to form a first sequence of said first plurality of linked list elements, each of said pointers of said first plurality of linked list elements being stored at a common offset into the respective block of said memory;
   second means for generating a second linked list comprising a second plurality of linked list elements and writing said second plurality of linked list elements into respective blocks of said memory, each of said second plurality of linked list elements comprising a pointer to another linked list element in said second linked list to form a second sequence of said second plurality of linked list elements, each of said pointers of said second plurality of linked list elements being stored at a common offset into the respective block of said memory, said common offset of said pointers of said second plurality of linked list elements being different than said common offset of said pointers of said first plurality of linked list elements, said first and second linked lists including one common linked list element;
   first head node means for identifying a location in said memory one of said first plurality of linked list elements, said first head node means comprising a specification of the common offset of said pointers of said first plurality of linked list elements; and
   second head node means for identifying a location in said memory one of said second plurality of linked list elements, said second head node means comprising a specification of the common offset of said pointers of said second plurality of linked list elements.

2. The data processor system as set forth in claim 1 wherein said pointers of said first plurality of linked list elements are forward pointers.

3. The data processor system as set forth in claim 2 wherein said pointers of said second plurality of linked list elements are forward pointers.

4. The data processor system of claim 1, wherein
   said pointer for each of said first plurality of linked list elements is a forward pointer in said first linked list, and the first generating means also stores for each of said first plurality of linked list elements in the respective block of memory a backward pointer for said first linked list, each of said backward pointers of said first plurality of linked list elements being stored at a common offset into the respective block of said memory;
   said pointer for each of said second plurality of linked list elements is a forward pointer in said second linked list, and the second generating means also stores for each of said second plurality of linked list elements in the respective block of memory a backward pointer for said second linked list, each of said backward pointers of said second plurality of linked list elements being stored at a common offset into the respective block of said memory, the common offsets of said backward pointers of said first and second pluralities of linked list elements being different than each other and different than the forward pointers of said first and second pluralities of linked list elements; and further comprising
   first head node means comprising:
      a head pointer which points to a head of said first linked list;
      a tail pointer which points to a tail of said first linked list;
      a specification of the common offset for the forward pointers of said first plurality of linked list elements; and
      a specification of the common offset for the backward pointers of said first plurality of linked list elements
   second head node means comprising:
      a head pointer which points to a head of said second linked list;
      a tail pointer which points to a tail of said second linked list;
      a specification of the common offset for the forward pointers of said second plurality of linked list elements; and
      a specification of the common offset for the backward pointers of said second plurality of linked list elements.

5. A data processor system comprising:
   a memory;
   first means for generating a linked list comprising a plurality of linked list elements and writing said plurality of linked list elements in respective blocks of said memory, each of said plurality of linked list elements comprising a forward pointer to a successor linked list element and a backward pointer to a predecessor linked list element in said linked list, each of said forward pointers of said plurality of linked list elements being stored at a common offset into the respective block of said memory and each of said backward pointers of said plurality of linked list elements being stored at a common offset into the respective block of said memory, said common offset of said forward pointers being different than said common offset of said backward pointers;
   a head node comprising a head pointer which points to a first one of said linked list elements at a head of said linked list;

a tail pointer which points to a least one of said linked list elements at a tail of said linked list;

a specification of the common offset for the forward pointers of said plurality of linked list elements; and a specification of the common offset for the backward pointers of said plurality of linked list elements; and dequeueing means for dequeueing said last one of said linked list elements, said dequeueing means comprising:

first means for replacing said tail pointer of said head node means with a pointer to a next to last one of said linked list elements;

second means for replacing the forward pointer of said next to last one of said linked list element with a forward pointer to said head node means; and first locking means, active during said dequeueing, for locking access to said tail pointer of said head node means and locking access to said forward pointer of said next to last one of said linked list elements; and enqueueing means for enqueueing a new linked list element onto the head of said linked list concurrently with said dequeueing of said last one of said linked list elements from said tail of said linked list, said enqueueing means comprising first means for loading a forward pointer of said new linked list element with said head pointer;

second means for replacing said head pointer of said head node means with a pointer to said new linked list element;

third means for loading a backward pointer of said new linked list elements with a pointer to said head node means;

fourth means for replacing the backward pointer of the linked list element which succeeds said new linked list element in said linked list with a pointer to said new linked list element; and second locking means, active during said enqueueing, for locking access to said head pointer of said head node means and locking access to said backward pointer of said linked list element which succeeds said new linked list element.

6. A data processor system comprising:

a memory;

first means for generating a linked list comprising a plurality of linked list elements and writing said plurality of linked list elements in respective blocks of said memory, each of said plurality of linked list elements comprising a forward pointer to a successor linked list element and a backward pointer to a predecessor linked list element in said linked list, each of said forward pointers of said plurality of linked list elements being stored at a common offset into the respective block of said memory and each of said backward pointers of said plurality of linked list elements being stored at a common offset into the respective block of said memory, said common offset of said forward pointers being different than said common offset of said backward pointers;

a head node comprising a head pointer which points to a first one of said linked list elements at a head of said linked list;

a tail pointer which points to a least one of said linked list elements at a tail of said linked list;

a specification of the common offset for the forward pointers of said plurality of linked list elements; and a specification of the common offset for the backward pointers of said plurality of linked list elements;

dequeueing means for dequeueing said first one of said linked list elements, said dequeueing means comprising:

first means for replacing said head pointer with a pointer to a second one of said linked list elements which succeeds said first linked list element in said linked list;

second means for replacing a backward pointer of said second one of said linked list elements with a pointer to said head node means; and first locking means, active during said dequeueing, for locking access to said head pointer of said head node means and locking access to said backward pointer of said second linked list element; and enqueueing means for enqueueing a new linked list element onto the head of said linked list concurrently with said dequeueing of said first one of said linked list elements from the head of said linked list, said enqueueing means comprising first means for loading a forward pointer of said new linked list element with a pointer to said head node means;

second means for loading a backward pointer of said new linked list elements with a pointer to a preceding one of said linked list elements;

third means for replacing said tail pointer of said head node means with a pointer to said new linked list element;

fourth means for replacing the backward pointer said preceding one of said linked list element with a pointer to said new linked list element; and second locking means, active during said enqueueing, for locking access to said tail pointer of said head node means and locking access to said forward pointer of said preceding one of said linked list elements.

* * * * *